United States Patent
Jones, Jr. et al.

(10) Patent No.: US 7,171,482 B2
(45) Date of Patent: Jan. 30, 2007

(54) SYSTEM AND METHOD FOR MANAGING BANDWIDTH UTILIZATION

(75) Inventors: Jerome Kemple Jones, Jr., Atlanta, GA (US); Scott Michael McLean, Suwanee, GA (US); Christopher Edward Foley, Alpharetta, GA (US)

(73) Assignee: iAnywhere Solutions, Inc., Richmond, VA (US)

( * ) Notice: Subject to any disclaimer, the term of this patent is extended or adjusted under 35 U.S.C. 154(b) by 770 days.

(21) Appl. No.: 10/194,077

(22) Filed: Jul. 12, 2002

(65) Prior Publication Data

US 2004/0010585 A1    Jan. 15, 2004

(51) Int. Cl.
*G06F 15/16* (2006.01)

(52) U.S. Cl. ............... 709/231; 709/220; 709/223; 709/224; 709/228; 709/232

(58) Field of Classification Search ........... 709/203, 709/223, 228, 220, 224, 231, 232
See application file for complete search history.

(56) References Cited

U.S. PATENT DOCUMENTS

| | | | |
|---|---|---|---|
| 5,313,454 A | 5/1994 | Bustini et al. | |
| 5,381,413 A | 1/1995 | Tobagi et al. | |
| 5,799,002 A | 8/1998 | Krishnan | |
| 5,805,823 A * | 9/1998 | Seitz | 709/236 |
| 5,805,892 A * | 9/1998 | Nakajima | 717/131 |
| 5,812,786 A | 9/1998 | Seazholtz et al. | |
| 5,848,266 A | 12/1998 | Scheurich | |
| 5,983,278 A | 11/1999 | Chong et al. | |
| 6,006,340 A | 12/1999 | O'Connell | |
| 6,222,856 B1 | 4/2001 | Krishnan et al. | |
| 6,249,530 B1 | 6/2001 | Blanco et al. | |
| 6,768,738 B1 * | 7/2004 | Yazaki et al. | 370/392 |
| 6,968,379 B2 * | 11/2005 | Nielsen | 709/226 |
| 2002/0147759 A1 * | 10/2002 | Ranganathan | 709/104 |
| 2003/0081692 A1 * | 5/2003 | Kwan et al. | 375/295 |
| 2003/0236961 A1 * | 12/2003 | Qui et al. | 711/170 |

* cited by examiner

*Primary Examiner*—Zarni Maung
*Assistant Examiner*—Nghi Tran
(74) *Attorney, Agent, or Firm*—Hunton & Williams LLP

(57) ABSTRACT

A method of managing bandwidth utilization during a communication session between a client system and a server system is disclosed. The method comprises monitoring data exchanged between the client system and server system, the client system operating a first application and a second application. The method further comprises detecting client-side contention for available bandwidth between the first application and the second application, and reducing accessible bandwidth for the first application based on the client-side contention. In one embodiment, the method further comprises increasing accessible bandwidth for the first application when client-side contention is no longer detected.

16 Claims, 21 Drawing Sheets

SYSTEM AND METHOD FOR MANAGING BANDWIDTH UTILIZATION

FIELD OF THE INVENTION

The present invention relates to systems and methods for managing the exchange of data between client and server systems. More specifically, the present invention relates to systems and methods for managing bandwidth utilization during a communication session between a client system and a server system.

BACKGROUND OF THE INVENTION

On multitasking operating systems, users often run multiple applications (or processes) concurrently. This can lead to a problem when more than one application attempts to access a resource, such as a network, at the same time. For example, consider a client machine running several applications: application A is a non-interactive network communications intensive application, while application B may be an interactive network communications application. Applications A and B contend for the limited and shared network bandwidth resource. This may cause a problem if application A consumes large amounts of bandwidth and prevents application B from obtaining adequate bandwidth, further causing application B to run at diminished capacity and resulting in a loss in productivity for the user. In this example, the presence of application B network activity would likely cause a measurable decrease in the bandwidth utilization of application A. Accordingly, there is a need to be able to detect this temporary decrease in throughput for application A and effectively manage bandwidth utilization between the competing applications. Furthermore, there is a need to measure the decrease in throughput from competing applications based on user-defined parameters.

In addition, the above example highlights the need for managing bandwidth utilization based on bandwidth control parameters effectuated at the client system, and which do not have to be communicated to the server system to achieve the desired utilization. This would reduce the need for additional processing at the server system, while also alleviating client-side network contention.

SUMMARY OF THE INVENTION

The present invention overcomes the disadvantages of known systems, and achieves additional advantages, by providing a method of managing bandwidth utilization during a communication session between a client system and a server system. In accordance with one aspect of the invention, the method comprises monitoring data exchanged between the client system and server system, the client system operating a first application and a second application. The method further comprises detecting client-side contention for available bandwidth between the first application and the second application, and reducing accessible bandwidth for the first application based on the client-side contention. In yet another embodiment, the method further comprises increasing accessible bandwidth for the first application when client-side contention is no longer detected.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

Figure 1:
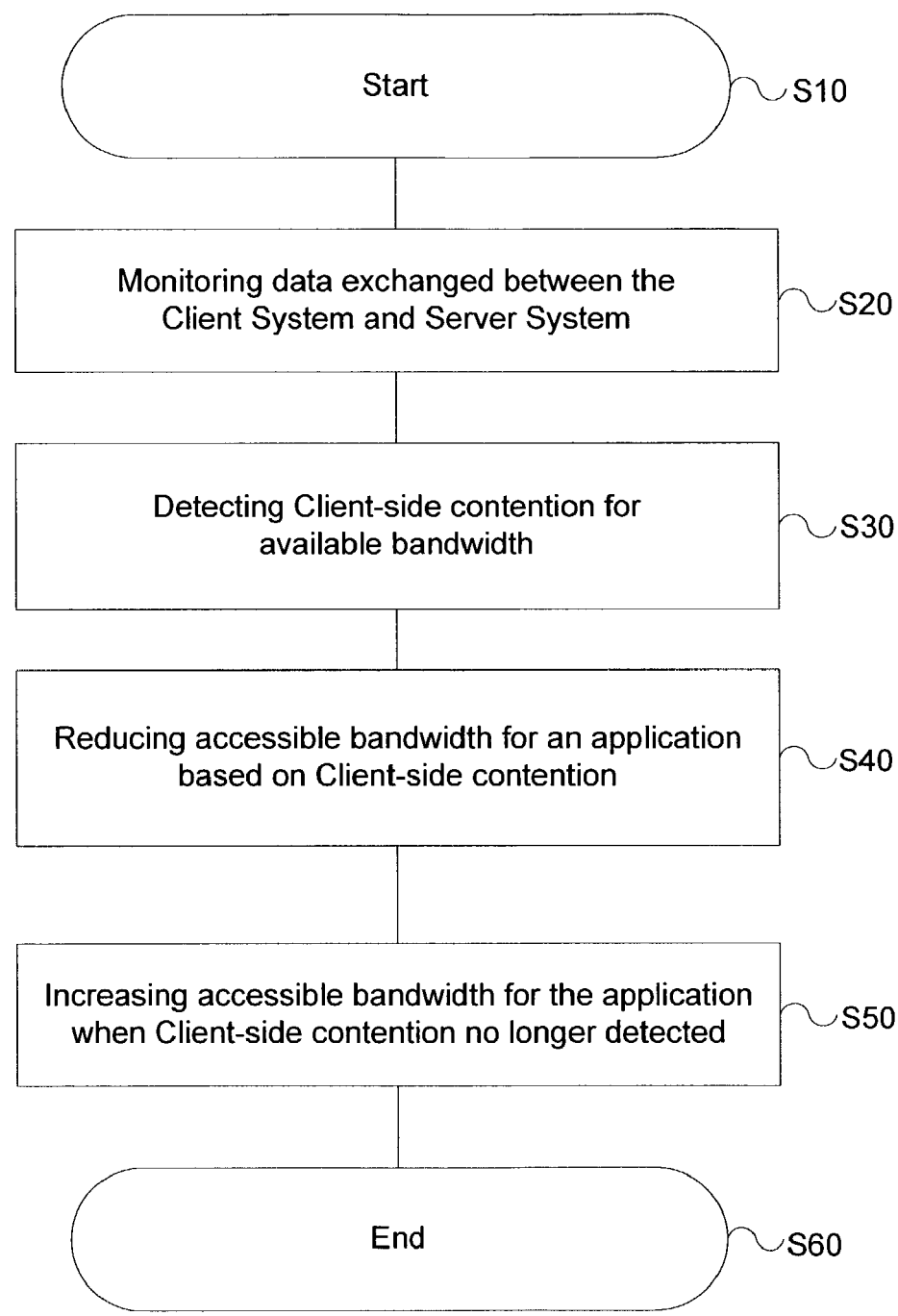
FIG. 1 is a flowchart showing an illustrative method of managing bandwidth utilization during a communication session between a client system and a server system in accordance with one embodiment of the system and method of the invention.

In one aspect of the invention, a method of managing bandwidth utilization during a communication session between a client system and a server system is provided. The method comprises monitoring data exchanged between the client system and server system, the client system operating a first application and a second application. The method further comprises detecting client-side contention for available bandwidth between the first application and the second application, and reducing accessible bandwidth for the first application based on the client-side contention. In yet another embodiment, the method further comprises increasing accessible bandwidth for the first application when client-side contention is no longer detected.

Further details of the systems and methods of the invention will hereinafter be described. It should be appreciated that items referred to in the singular may also be in the plural, and items referred to in the plural may also be in the singular.

As used herein, a "bandwidth management system," "server system," or "client system," may take the form of a computer operating system that performs computational functions. The computational functions may be performed utilizing a suitable processor and memory stores, i.e. a data memory storage device, for example. These computational functions may include processing input and information from users or administrators to perform functions and features of the system; utilizing input and information from users and other systems, as well as other data in the memory stores of the bandwidth management system, to generate output on various interfaces with users of the bandwidth management system; or outputting input or information gathered or produced by the bandwidth management system to other systems.

In one aspect, the present invention provides the ability for a server network application to detect and alleviate network contention occurring on the client system. By reducing the bandwidth utilization of a connected client application during a communications session, the invention alleviates contention occurring on the client system. Therefore, the system and methods of the invention performs three main functions: (1) tracking how much data is exchanged between a server and client system over time, i.e., throughput, (2) using the information obtained from the tracking of data to determine the throughput utilization and its relationship to user-defined bandwidth control parameters, and (3) reacting to changes in current throughput utilization. As used herein, "throughput" is defined as the number of bits transferred per second. Stated another way, throughout represents the effective communications rate, or speed, of data exchanged between a server and client system.

During a communications session between the server and client applications, the bandwidth management system continuously tracks the total number of units of data exchanged and the total amount of elapsed time over which the system has been operating and tracking exchanged data. The BM system stores the collected information in a session memory, also referred to as a "context", for later analysis or processing. As described herein, the context is a memory data structure used by the bandwidth management system to store data and values used during its operation. Each client-server communication session monitored by the bandwidth management system has its own and distinct instance of the context. Therefore, every new client-server communications session has an associated session memory, in which the data values monitored by the bandwidth management system are stored. It should be appreciated that all operations performed on one context instance are independent of other bandwidth management operations performed on another context instance.

In one embodiment of the invention, the following type of data is stored in and retrieved from a context: (1) data point collection, (2) data point collection timer, (3) working data point, (4) clock window size, (5) window size, (6) window checking interval timer, (7) pending state counter, (8) action state counter, (9) normal state timer, (10) pending state timer, (11) current throughput, (12) average throughput, (13) current throttle down threshold, (14) throttle down threshold percentage, (15) throttle down percentage, (16) target throttle down throughput, (17) throttle down wait time, (18) slow start increment, and (19) slow start interval period.

Other stored values include user-defined parameters such as maximum window size, minimum window size, throttle down threshold, throttle down wait time, throttle down percentage, the number of slow-start intervals and the period over which slow-start is executed. These user-defined parameters are used to control bandwidth utilization between the server and client systems. It should be appreciated that these parameters may be stored in a configuration file that an administrator may select for a given communication session. In that respect, the administrator may employ several customized configuration files suited for different needs, such as varying network connection speeds or types.

During its operation, the bandwidth management system continuously performs a series of throughput calculations based on the values reported from the server system representing the amount of data exchanged between it and the client system, along with the amount of time elapsed. First, the bandwidth management system calculates a "current throughput" value representing the number of units of data exchanged between the server and client system over a user-defined interval. For example, the system administrator may define the interval by a period of one-second. The current throughput may be determined by taking the total data units transferred over a small number of intervals, such as the last 10 one-second intervals, and dividing that total by the number of intervals examined, i.e., 10, to obtain the throughput rate in units of data transferred per second. Similarly, the system calculates an "average throughput" value representing a running average of the actual number of data units exchanged. This average can be calculated using the total data units transferred over a larger number of intervals, such as the last 120 one-second intervals.

Thereafter, the current throughput and average throughput values are compared to the bandwidth control parameters to determine the operation of the bandwidth management system. These parameters are set by a user, or administrator, to regulate the operation of data transfer between server and clients systems on a network. Based on the information collected and these user-defined parameters, the bandwidth management system instructs the server system on the amount of data that can be transferred to the client system. These parameters include the Maximum Client Throughput, or maximum window size—the maximum allowable throughput for the client-communication session, Minimum Client Throughput, or minimum window size—the minimum allowable throughput for the client-communication session, Throttle Down Threshold—the level, expressed as a percentage of average throughput, below which, the current throughput must fall before the bandwidth management system transfers from Normal state to Pending state, Throttle Down Wait Time—the amount of time that the current throughput must remain below the Throttle Down Threshold to trigger transition from the Pending to Action state, and Throttle Down Percentage—the amount by which the bandwidth management system directs the server system to reduce current throughput in the Action state.

Accordingly, an administrator can configure the system to maintain current throughput between the Maximum and Minimum client Throughput values. In one embodiment of the invention, this may be accomplished using a mechanism called a "window." The window, as used herein, is a simple counter that tracks and controls how many units of data may be sent at any given time, i.e., the window size. As data is transferred, the window size is decreased by the number of actual units of data transferred. The window size is reset to its initial value at fixed intervals, such as every second, for example. During its operation, the system maintains the following relationships:

$0 \leq$ Window Size $\leq$ Clock Window Size

Minimum Window Size $\leq$ Clock Window Size $\leq$ Maximum Window Size.

Accordingly, when the window size equals zero, no data may be transferred.

In essence, while operating, the system and method of the invention dynamically calculates a threshold value (Current Throttle Down Threshold) equal to a fixed percentage of the average throughput. When the current throughput falls below this level and remains there for a fixed duration (Throttle Down Wait Time), the system throttles down, or reduces, throughput. The system reduces the window size to an amount equal to a percentage of current throughput, but not less than a minimum level (Minimum Window Size), until average throughput falls below the user-defined throughput level for reducing contention (Target Throttle Down Throughput). Once this occurs, the system attempts to throttle up, or increase, throughput back to the initial throughput values (clock window size) set by the administrator.

To provide further illustration, consider, for example, an enterprise system administrator that would like to improve productivity for his network users, or clients. The administrator employs the bandwidth management system by setting the operational parameters as follows:

| | |
|---|---|
| Maximum Window Size = | 48,800 bits per second (bps) |
| Minimum Window Size = | 9,600 bps |
| Throttle-Down Percentage = | 50% of current throughput when throttle action taken |
| Throttle-Down Threshold = | 10% of overall average throughput |
| Throttle-Down Wait Time = | 5 seconds. |

During a client-communication session, the measured current throughput and average throughput are both 31,000 bps, which is below the maximum window size value. The next throughput measurement indicates that the current throughput rate is now 17,000 bps—a decrease of greater than 10% of the average throughput, 31,000 bps. After five seconds, throughput measurements do not rise above the throttle-down threshold of 27,900 bps (i.e., 31,000 bps—10% of 31,000 bps) and current throughput is 25,000 bps. The bandwidth management system will then instruct the server system to reduce throughput to 50% of current throughput, 12,500 bps. If, however, the current throughput had risen above 27,900 bps in the five sections following the measured decrease in throughput, the system would return to normal throughput monitoring.

Method of Managing Bandwidth Utilization

FIG. 1 is a flowchart showing an illustrative method of managing bandwidth utilization during a communication session between a client system and a server system in accordance with one embodiment of the system and method of the invention. As shown in FIG. 1, the process begins in step S10, then passes to step S20, wherein the data exchanged between a server system and a client system is monitored. Then, client-side contention for available bandwidth is detected in step S30.

Client-side contention occurs when a client system running more than one network application experiences a reduction in processing speed based on the amount of data being transferred to the client system over the network. Illustratively, the amount of data that can be transferred to the client system is measured in terms of bandwidth. To provide further understanding, bandwidth can be understood as a "pipe" to the client system. When clients in an enterprise system access the network, the enterprise system transfers a certain amount of data to the client system during the communication session. Assume that this data fills 75% of the pipe. In addition, the client uses a web browser to view a news website, which must go through the pipe as well. When the page is requested, the bandwidth management system detects the two applications competing for space in the pipe. As described above, contention can be detected by comparing the actual number of data units transferred to the client system over time, with the administrator-defined bandwidth control parameters.

In response to the contention, in step S40, the accessible bandwidth for one application is reduced. The current throughput for the first application is reduced to a level that alleviates the client-side contention. In example described above, the bandwidth management system instructs the enterprise server to send less data while the client is viewing the website. Once the average output falls below the desired throttle down throughput, in step S50, the accessible bandwidth for the first application is increased. This corresponds with the recovery of the throughput back to pre-throttling conditions. At least in one embodiment, this recovery is performed over multiple step intervals while continuously testing for new contention. The process then ends in step S60.

The above described method may be accomplished using a bandwidth management system in communication with a server system in a network. These methods are suitably adapted for use by enterprise server systems inputting and outputting data to networked client systems. All of these systems, servers, clients and bandwidth management, may take the form of computer operating systems performing computational functions. Further information is provided below on other embodiments of illustrative bandwidth management systems.

Figure 2:
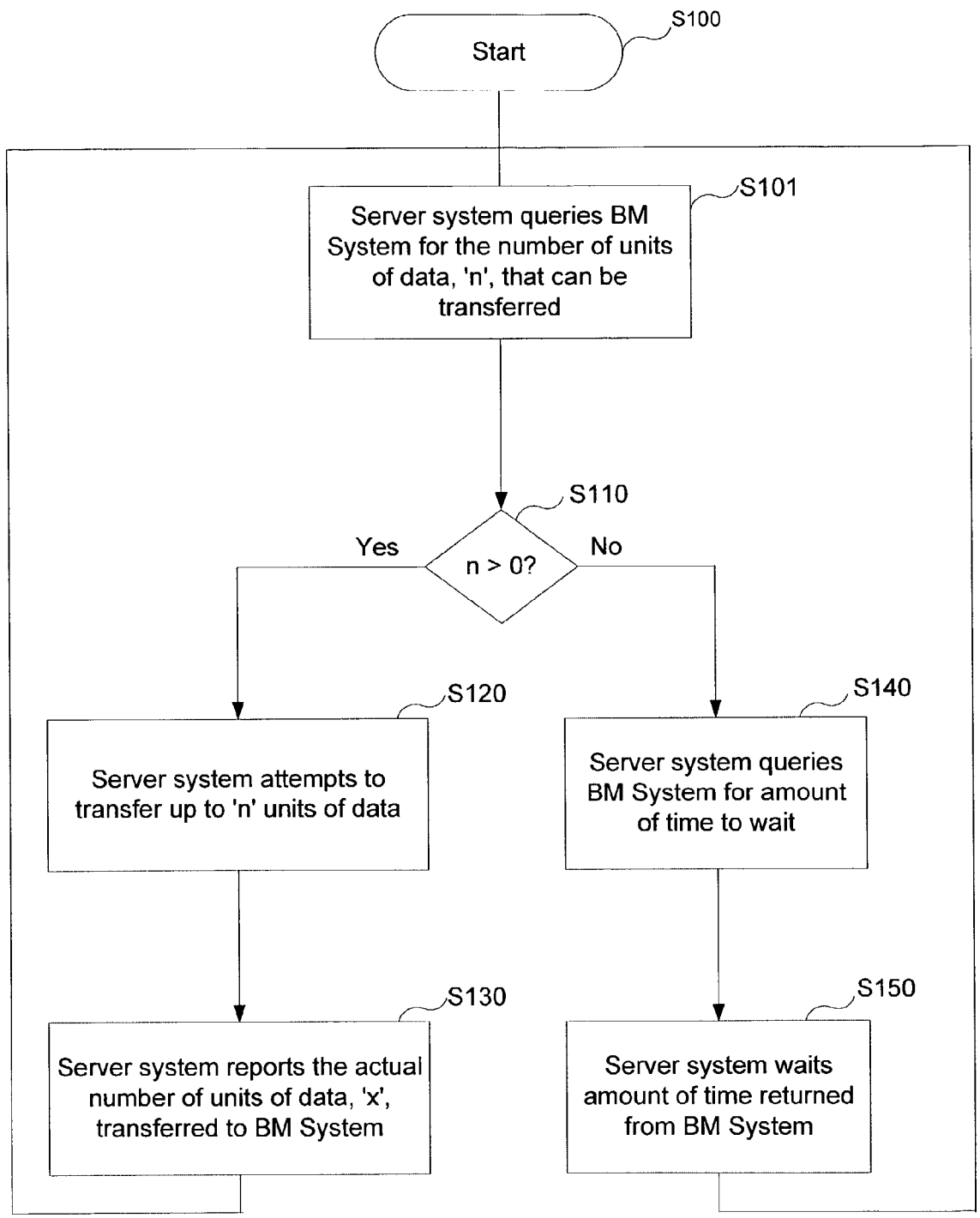
FIG. 2 is a flowchart showing an illustrative interaction between a server system and a bandwidth management system in accordance with one embodiment of the system and method of the invention.

To provide additional understanding on the interaction between the server system and a bandwidth management system, FIGS. 2–5 are described below. FIG. 2 is a flowchart showing an illustrative interaction between a server system and a bandwidth management system in accordance with one embodiment of the system and method of the invention. For purposes of describing the various embodiments shown in FIGS. 2–5, it should be appreciated that the bandwidth management system may represent another computer operating system or state machine in the network separate from the server system, or an application run by the server system itself.

As shown in FIG. 2, the process begins in step S100 and passes to step S101, wherein the server system queries the bandwidth management system for the number of units of data, 'n', that can be transferred to the client system. In step S110, the bandwidth management system determines whether the number of units of data that can be transferred to the client system is greater than 0. If the number of units of data that can be transferred is greater than 0, the bandwidth management system reports this number to the server system, and the process passes to step S120. Alternatively, if no units of data can be transferred, the bandwidth management system reports this to the server system, and the process passes to step S140. In step S120, the server system attempts to transfer up to 'n' units of data. It should be appreciated that the actual number of units of data transferred is less than or equal to 'n'. In step S130, the server system reports the actual number of units of data transferred to the bandwidth management system. Once the number of data units transferred is reported to the bandwidth management system, the process returns to step S101.

If the server system determines that no data units can be transferred to the client system, in step S140, the server system queries the bandwidth management system for an amount of time to wait. Then, in step S150, the server system waits the amount of time returned from the bandwidth management system, following which the process returns to step S101. Steps S140 and S150 allow the server system to reduce the number of times (otherwise known as "busy polling") that it must communicate with the bandwidth management system before data can be transferred to the client system. However, an "event-driven" model may be employed in place of steps S140 and S150, such that the server system would wait until it received notification that it could transfer up to 'n' units of data. FIG. 2 also demonstrates that the interaction between the server system and the bandwidth management system, while enabled, repeats continuously during a client communication session.

Figure 3:
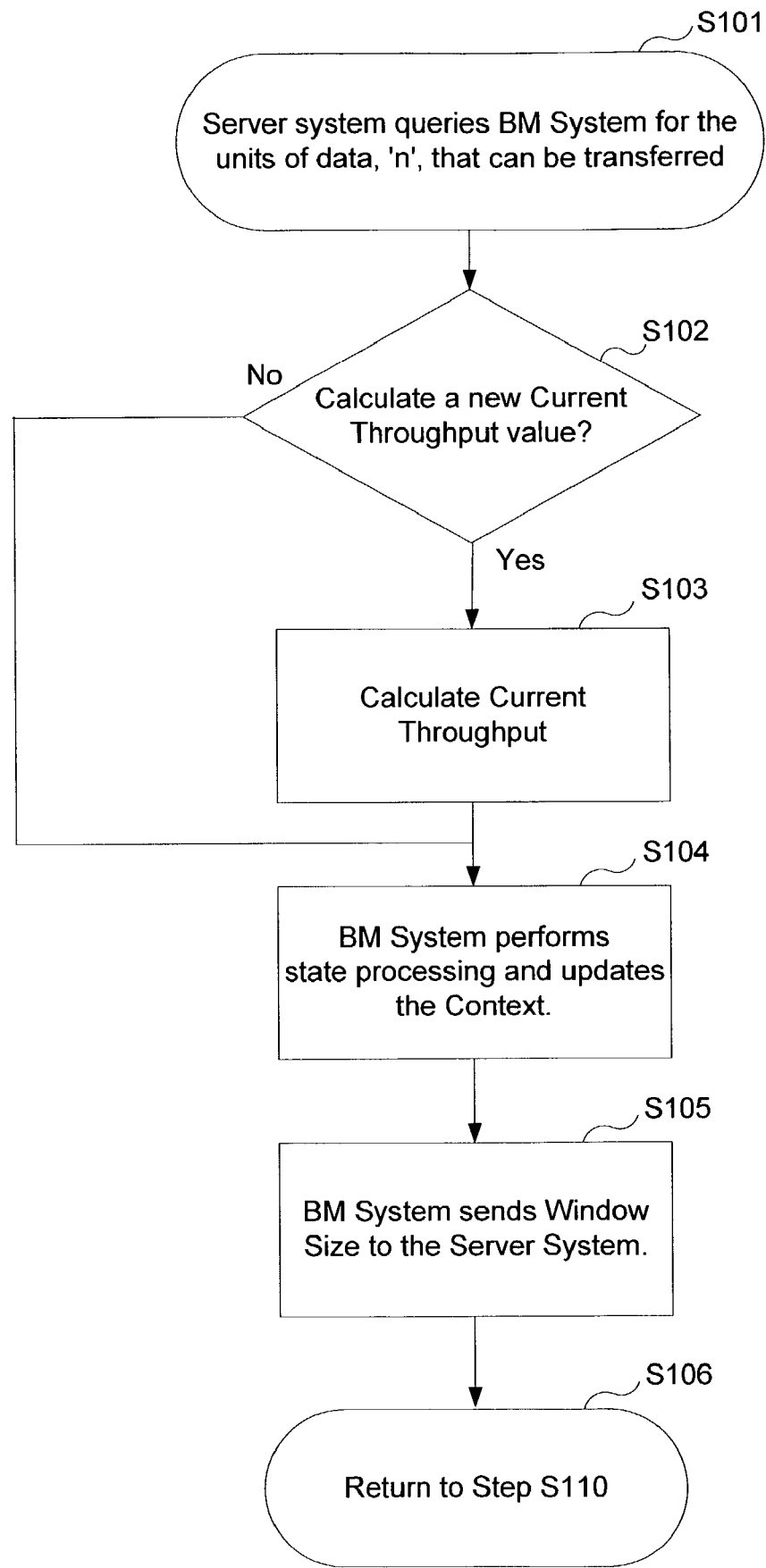
FIG. 3 is a flowchart showing the "Server system queries BM System for the units of data, 'n', that can be transferred" step of FIG. 2 in further detail in accordance with one embodiment of the system and method of the invention.

FIG. 3 is a flowchart showing the "Server system queries BM system for the units of data, 'n', that can be transferred" step of FIG. 2 in further detail and in accordance with one embodiment of the system and method of the invention. This process begins in step S101 and passes to step S102, wherein the bandwidth management system determines whether or not to calculate a new current throughput value. In this embodiment, the system determines a new current throughput value if the working data point value has changed since the last time this determination was made. If the bandwidth management system calculates a new current throughput value, the process passes to step S103. Then, in step S103, the bandwidth management system calculates the current throughput, and the process passes to step S104. If the bandwidth management system determines that a new current throughput value is not necessary in step S102, the process moves directly to step S104.

In step S104, the bandwidth management system performs state processing and updates the context. The state processing may include determining if the bandwidth management system should enter or exit various states controlling bandwidth utilization, update data stored in the session memory, or context, and controls the window size. Further aspects of the operating configuration for the bandwidth management system, and its relation to the data stored for each session, are described in detail below.

Returning to FIG. 3, the bandwidth management system sends the window size to the server system in step S105. The process then passes to step S106, wherein it returns to step S110. However, once the bandwidth management system reports the number of units that can be transferred, the server system must report the actual number of units of data transferred, to the bandwidth management system. This number, along with the elapsed time is stored in suitable memory for later processing by the bandwidth management system. As described above, these data pairs are critical in determining the bandwidth management state and providing future instructions to the server system. Accordingly, the server system reports the number of units of data transferred to the client system each time data is sent or received, i.e., at the end of an input/output operation, even if the window clocking interval has not expired.

Figure 4:
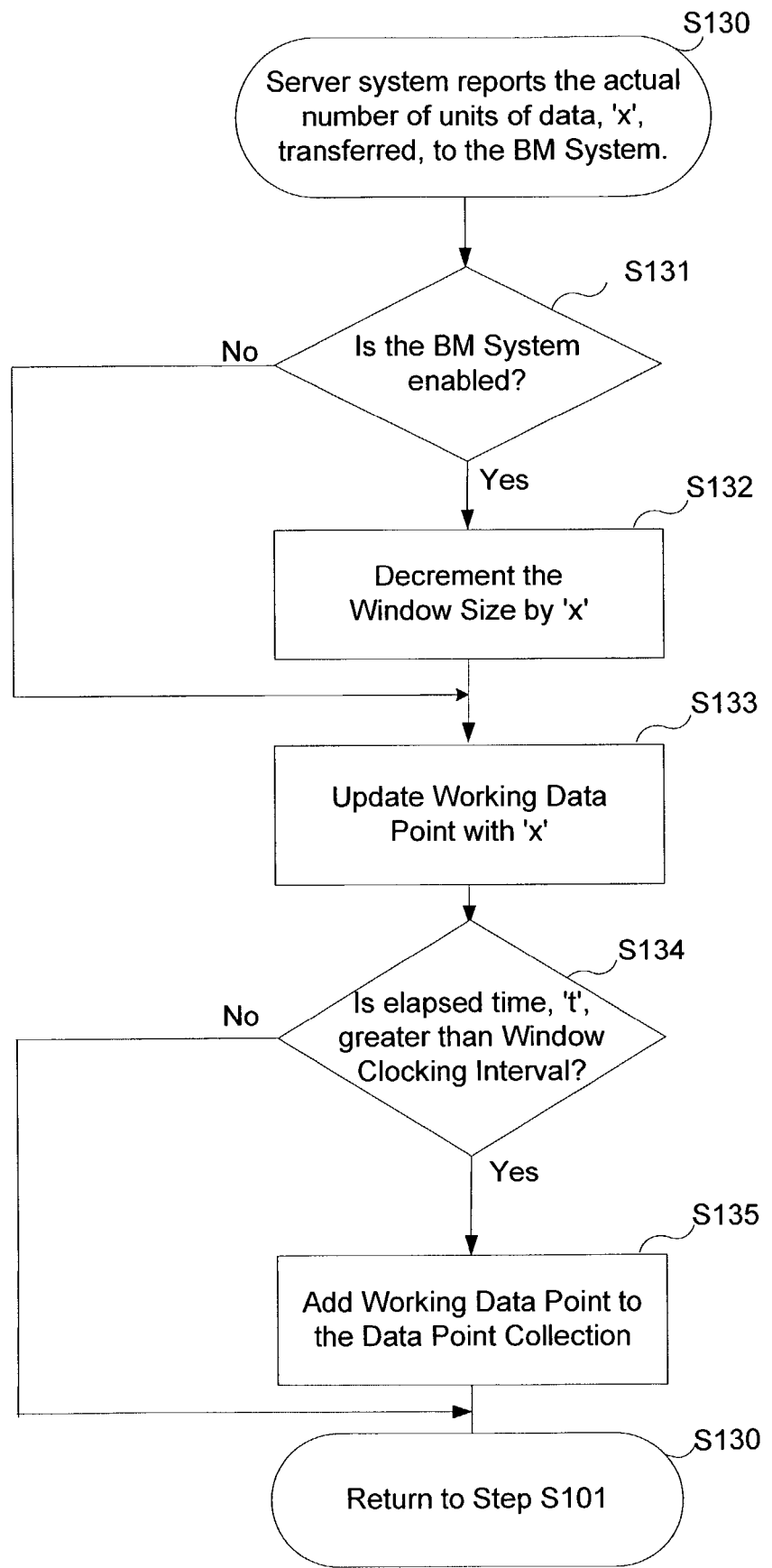
FIG. 4 is a flowchart showing the "Server system reports the actual number of units of data, 'x', transferred to the BM System" step of FIG. 2 in further detail in accordance with one embodiment of the system and method of the invention.

FIG. 4 is a flowchart showing the "Server system reports the actual number of units of data, 'x', transferred, to the BM system" step of FIG. 2 in further detail in accordance with one embodiment of the system and method of the invention. This process begins in step S130 and proceeds to step S131, wherein the determination is made whether or not the bandwidth management system is enabled. In order to operate, the bandwidth management system must be enabled by a system user, or the administrator of an enterprise system.

When the bandwidth management system is enabled, the process passes to step S132, wherein the window size is decremented by X, or the current value of the window size, whichever is less. This allows subsequent operations to decrease the amount of data that can be transferred at a given time, i.e., the window size, until it reaches zero. Once the window size reaches zero, no more data can be transferred until the window size is reset. Once decreased as described above, the window size value is updated in the session memory.

When the window size has been decreased, the process passes to step S133. If the bandwidth management system is not enabled in step S131, the process also passes to step S133. If the bandwidth management system has updated, or increased, the working data point with X in step S133, it saves the updated value in the session memory. Thus, the working data point represents the total data units transferred during the window clocking interval. In other embodiments, an intermediate step may exist whereby the value X is distributed across the last few data points to compensate for latency effects due to no data being transferred for a time greater than the clocking interval.

Then, in step S134, the bandwidth management system determines if the elapsed time, 't', is greater than the window clocking interval. This may be accomplished by determining if the data point collection timer has expired. In accordance with the invention, data points representing the total number of units of data transferred (working data point) and elapsed time are collected and stored in the session memory. These data points are periodically added to the data point collection in the session memory. In operation, a data point is added to the data point collection each time the data point collection timer expires. This period of time may also be expressed as the window clocking interval. In one embodiment, the data point collection timer expires at one-second intervals. However, it should be appreciated that the bandwidth management system may repeatedly receive information from the server system indicating data transferred to or from the client system before this interval has expired.

If the elapsed time is greater than the window clocking interval, the process passes to step S135, wherein the bandwidth management system adds the working data point to the data point collection. It should be appreciated that the data point collection contains a user-defined, or predetermined, number, 'z', of data points. To conserve memory, each time a data point is added to the data point collection, a check is made to determine if the number of data points in the collection exceeds 'z'. If so, the requisite number of data points are removed from the collection until the number of points in the collection is equals 'z'. In this embodiment, data points are maintained in the collection utilizing a First-In First-Out (FIFO) strategy, which preserves the most recently added 'z' number of data points. Therefore, if the invention requires 120 data points to calculate the average throughput over the last 120 1-second intervals, the data point collection must contain at least 120 data points.

Returning to FIG. 4, if the elapsed time is not greater than the window clocking interval, the process passes to step S130. Thereafter, in step S130, the process returns to step S101.

In essence, the bandwidth management system allows up to a certain amount of data, i.e., the window size, to be transferred over a fixed interval (the window clocking interval). At the end of each fixed interval, the bandwidth management system stores the elapsed time and the amount of data actually transferred by the server system, even if the server system did not transfer the full amount of data is was authorized to send. Once the fixed interval expires, the bandwidth management system clocks the window size, i.e., resets the amount the server system can transfer, and the monitoring continues.

Figure 5:
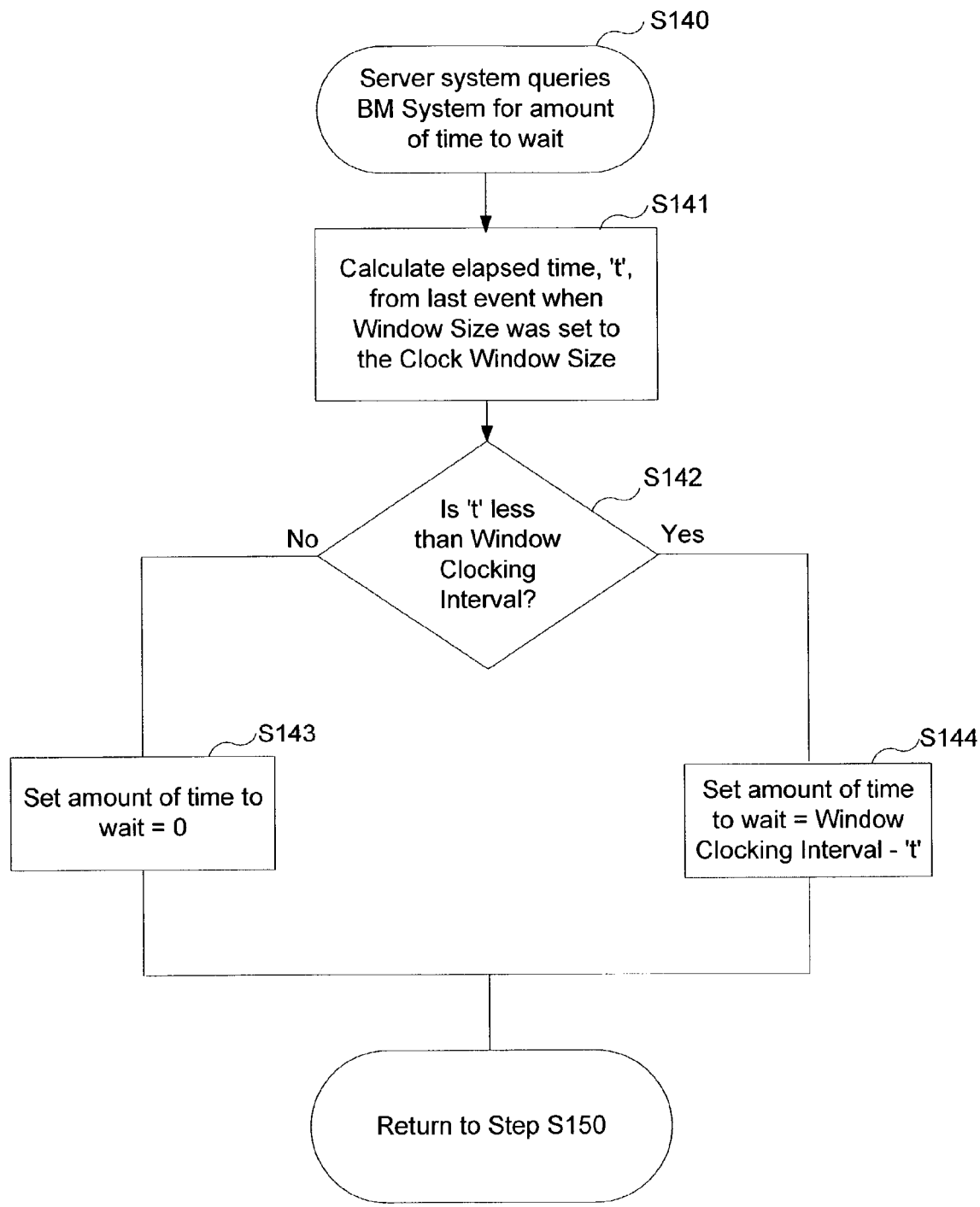
FIG. 5 is a flowchart showing the "Server system queries BM System for amount of time to wait" step of FIG. 2 in further detail in accordance with one embodiment of the system and method of the invention.

FIG. 5 is a flowchart showing the "Server system queries BM system for amount of time to wait" step of FIG. 2 in further detail in accordance with one embodiment of the system and method of the invention. Once this process begins in step S140, it passes to step S141. In step S141, the bandwidth management system calculates the elapsed time, 't', from the last time when the window size was set to the clock window size. Then, in step S142, the bandwidth management system determines if 't' is less than the window clocking interval. If so, the process passes to step S144 wherein the amount of time to wait is set to the window clocking interval less 't'. The process then passes to step S145. Alternatively, if 't' is not less than the window clocking interval, the process passes to step S143. Once the amount of time to wait is set to 0 in step S143, the process passes to step S145. The process then returns to step S150.

Bandwidth Management State

As stated above, the systems and methods of the invention operate based on various states that control the instructions provided to the server system on bandwidth utilization. To illustrate the relationship between the various states of the bandwidth management system, FIG. 6 is described below.

Figure 6:
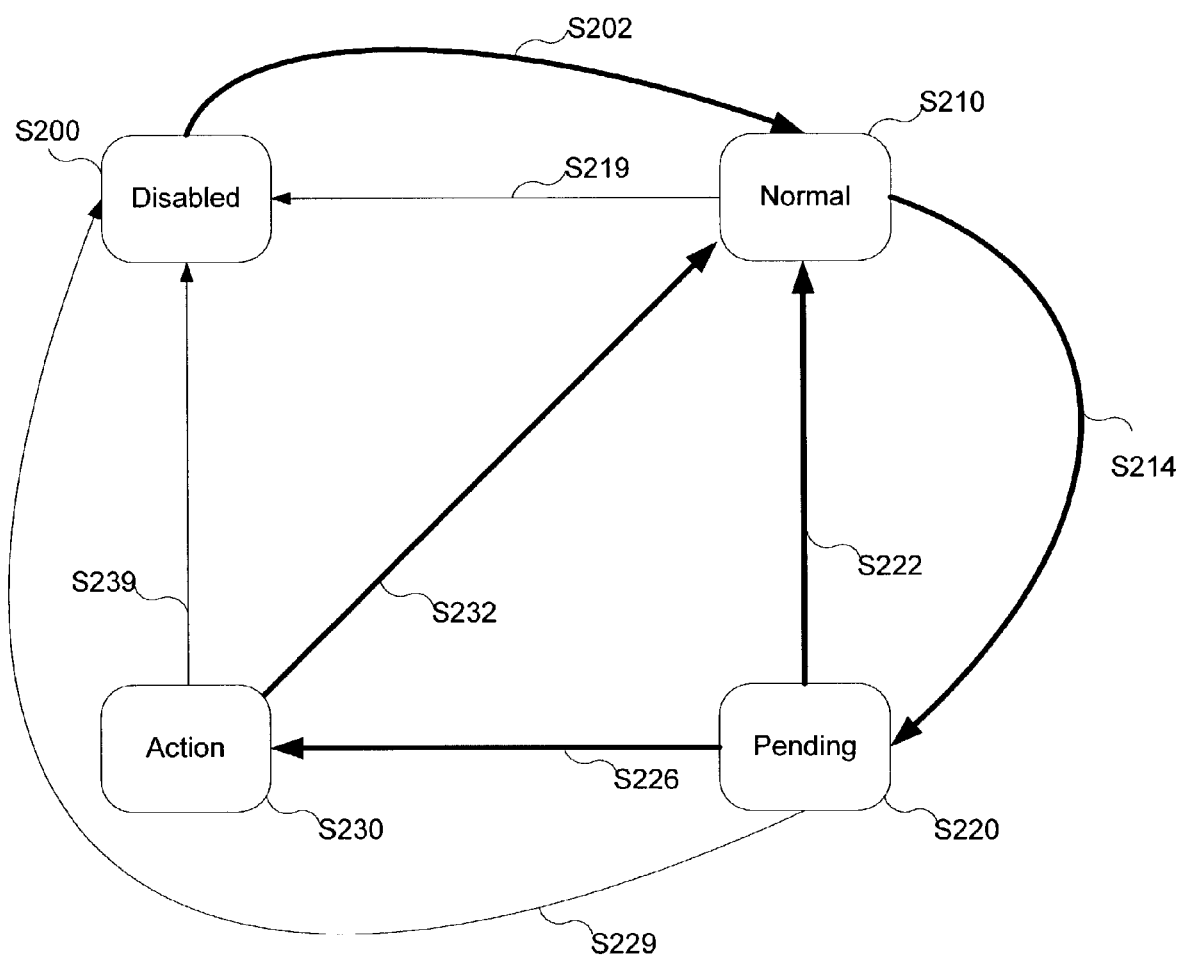
FIG. 6 is a diagram showing the bandwidth management system state in accordance with one embodiment of the system and method of the invention.

FIG. 6 is a diagram showing the bandwidth management system state in accordance with one embodiment of the system and method of the invention. As stated above, an administrator or user must enable the bandwidth management system. Therefore, in step S200, the bandwidth management system begins in the Disabled state. The bandwidth management system remains in the Disabled state until it receives an enable signal, and transitions to the Normal state in step S202. In step S210, the bandwidth management system operates in the Normal state. This has the effect of creating an instance of session memory, or context for the communication session being monitored. While in the Normal state, if the bandwidth management system detects that the current throughput is less than or equal to the current throttle down threshold (i.e. dynamically calculated value, saved in session memory, equal to user-defined percentage of average throughput), it transitions to the Pending state in step S214.

In step S220, the bandwidth management system operates in the Pending state. While in the Pending state, if the bandwidth management system detects that current throughput rises above the current throttle down threshold, it transitions back to the Normal state in step S222. Otherwise, if the current throughput remains less than or equal to the current throttle down threshold for longer than the throttle down wait time (user-defined), the bandwidth management system transitions to the Action state in step S226.

In step S230, the bandwidth management system operates in the Action state. While in the Action state, if the bandwidth management system detects that the calculated average throughput is less than or equal to the throttle down target throughput (i.e. dynamically calculated value, saved in session memory, equal to user-defined percentage of current throughput), it transitions back to the Normal state in step S232. Otherwise, the bandwidth management system remains in the Action state until it transitions back to the Normal state or is disabled.

At anytime during its operation, the bandwidth management system may receive a disable signal. Accordingly, upon receipt of the disable signal, the bandwidth management system ceases its operations and transitions to the Disabled state. This is represented by steps S219, S229 and S239 from the Normal, Pending and Action states, respectively.

The various states and relationships described above allow the bandwidth management system to instruct the server system on the amount of data that can be transferred over any given interval. FIGS. 7–11 provide further detail of the various states, and are described below.

Figure 7:
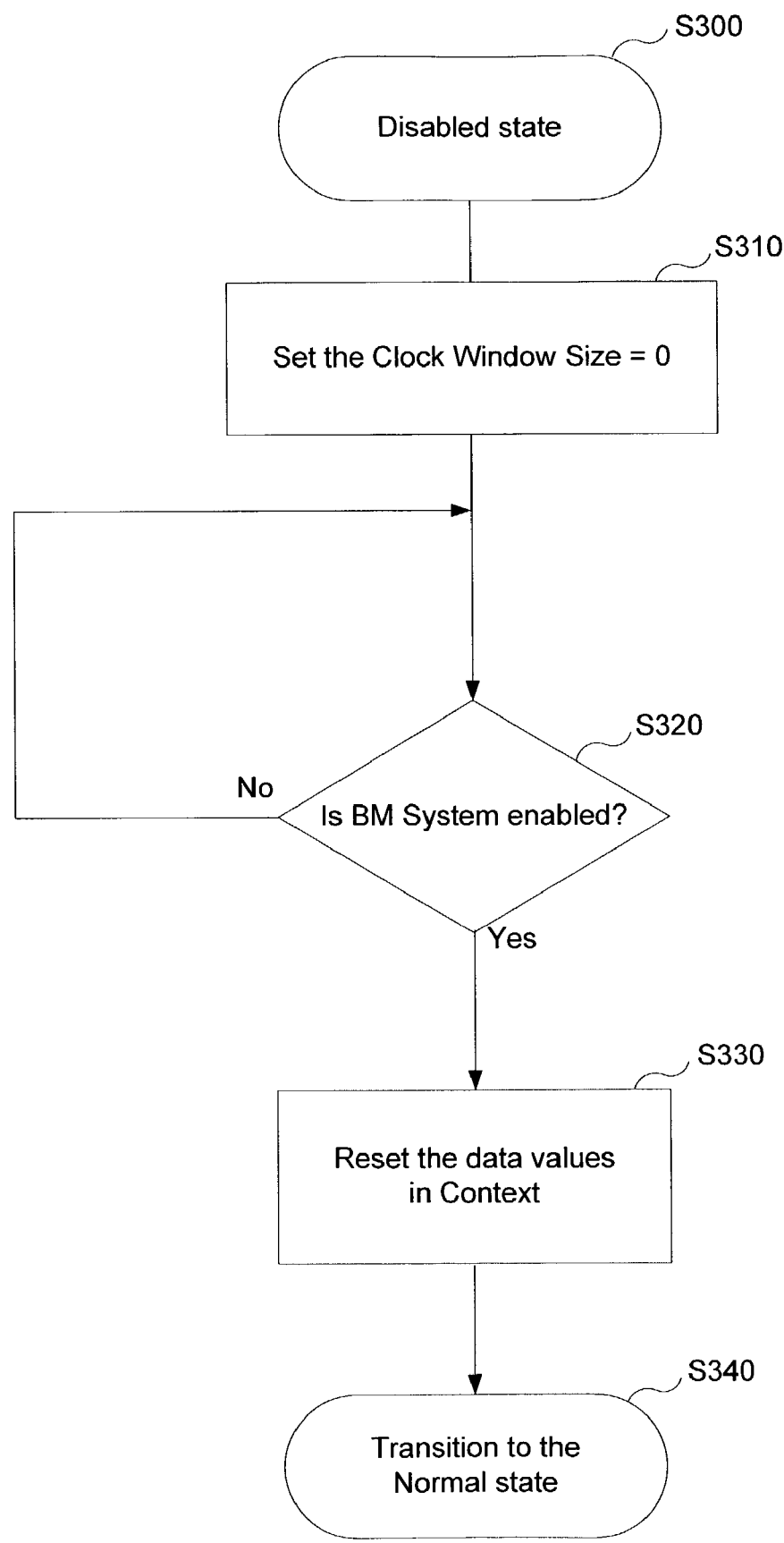
FIG. 7 is a flowchart showing the operation of an illustrative bandwidth management system in a disabled state in accordance with one embodiment of the system and method of the invention.

FIG. 7 is a flowchart showing the operation of an illustrative bandwidth management system in a Disabled state in accordance with one embodiment of the system and method of the invention. Disabled state begins in step S300, and moves to step S310, wherein the clock window size is set to zero. Then, in step S320, the bandwidth management system monitors whether it has been enabled, i.e., received an enable signal. If not, the system continuously monitors for an enabling signal in step S320. However, if the bandwidth management system is enabled, the operation passes to step S330, in which the bandwidth management system resets the calculated data values in the context created for the client communication session. Then, in step S340, the bandwidth management system transitions to the Normal state.

Figure 8A:
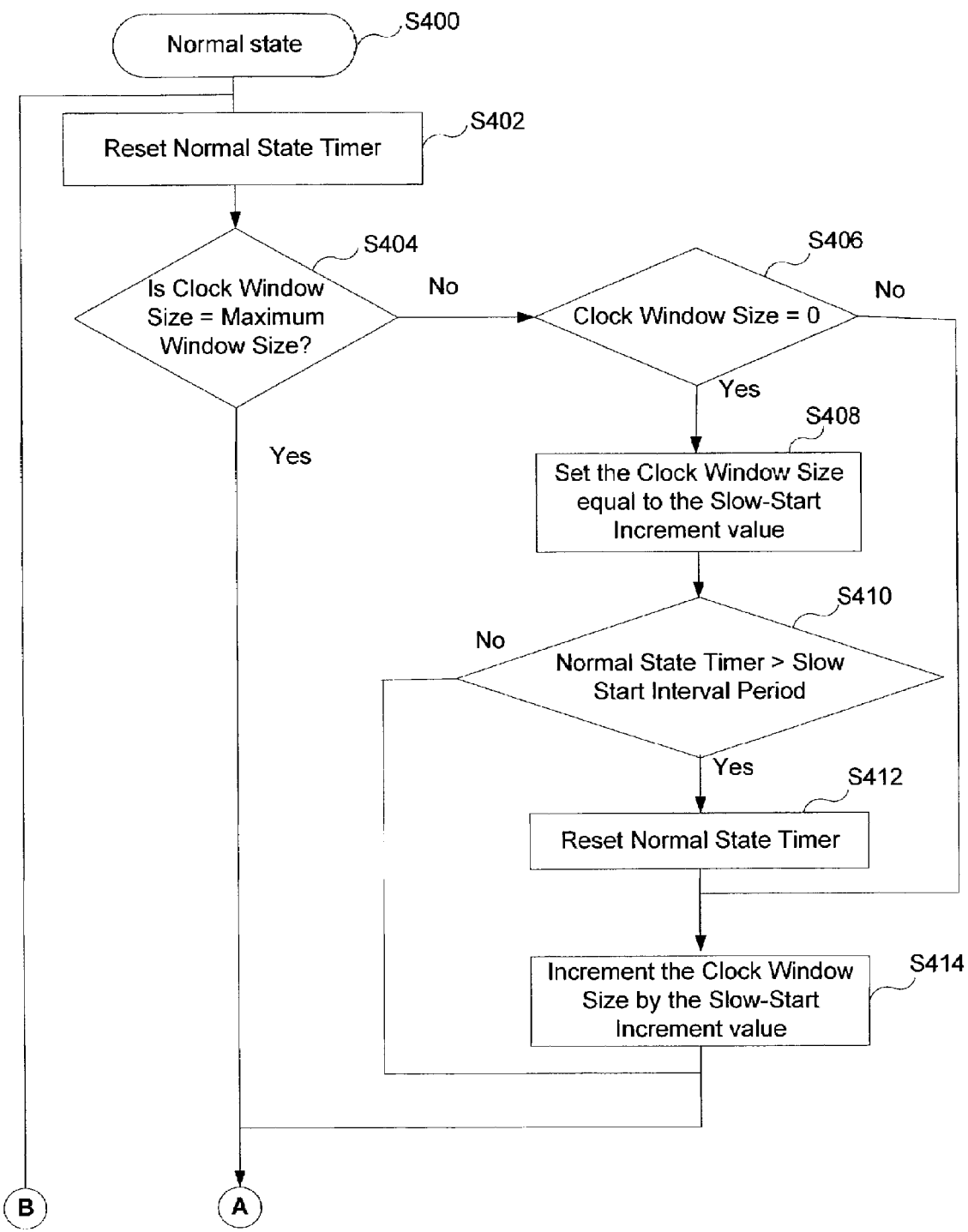
FIGS. 8a and 8b are flowcharts showing the operation of an illustrative bandwidth management system in a normal state in accordance with one embodiment of the system and method of the invention.
Figure 8B:
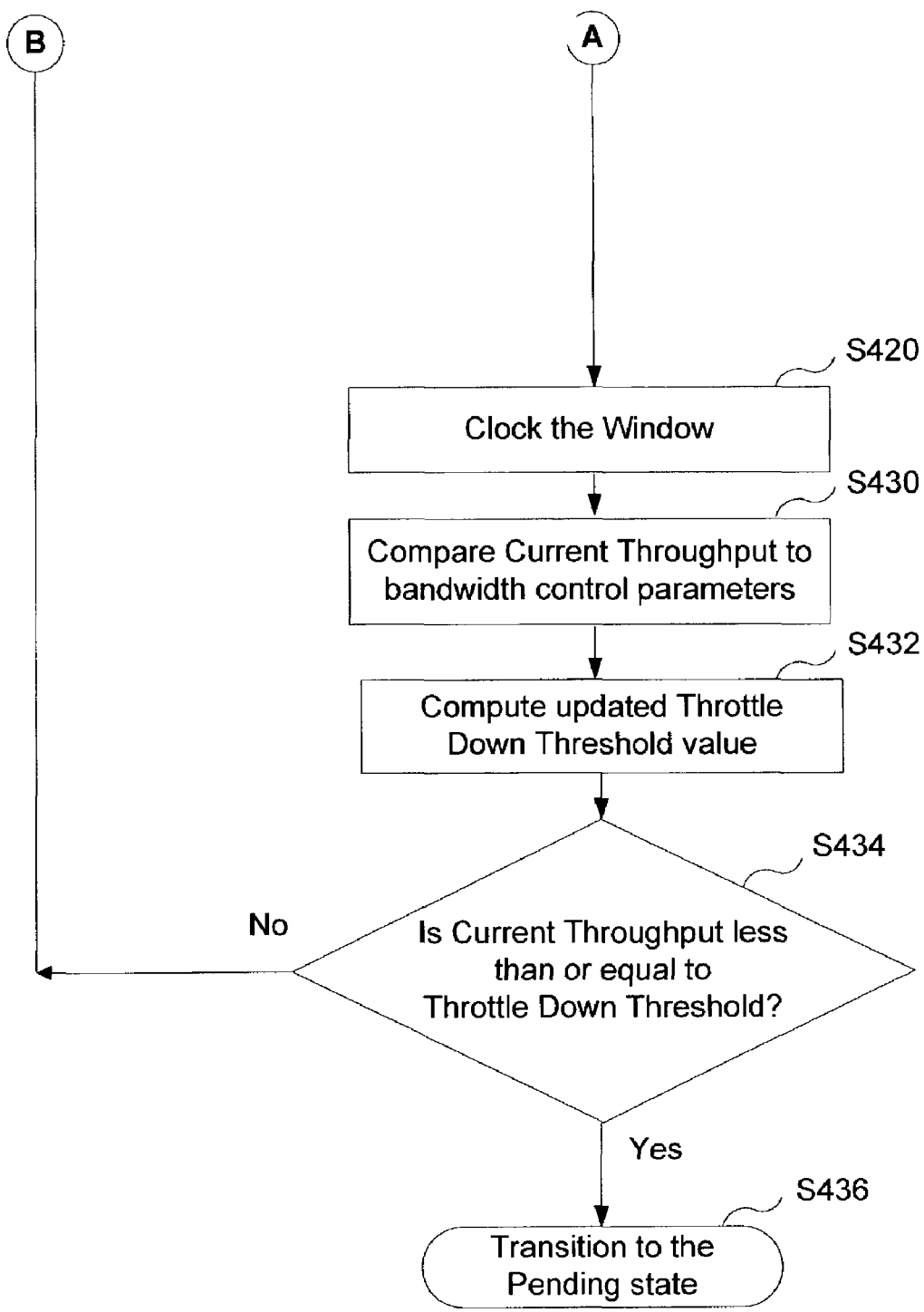

FIGS. 8a and 8b are flowcharts showing the operation of an illustrative bandwidth management system in a Normal state in accordance with one embodiment of the system and method of the invention. Normal state begins in step S400, and moves to step S402, wherein the Normal state timer is reset. The Normal state timer is the amount of time the bandwidth management system has been operating in the Normal state. Then, in step S404, the bandwidth management system determines if the clock window size is equal to the maximum window size. If so, the operation passes to step S420.

However, if the clock window size does not equal the maximum window size, the operation passes to step S406. The bandwidth management system then, in step S406, determines if the clock window size is equal to zero. The operation passes to step S408 if the clock window size is equal to zero. If not, the operation moves to step S414.

In step S408, the bandwidth management system sets the clock window size equal to the slow-start increment value. The slow-start increment value is determined by taking the difference between the current throughput and maximum window size (at the time the bandwidth management system transitions from Action to Normal state) and dividing the difference by the user-defined number of slow-start intervals. In the present embodiment, the bandwidth management system employs three slow-start intervals. Accordingly, when the bandwidth management system transitions from Action to Normal state, it utilizes a step strategy for recovering the allowable bandwidth utilization for the first application that had to be decreased in the Action state. The goal is to return the server system's throughput levels for the first application back to the pre-throttling conditions (i.e., the maximum window size). Thus, the bandwidth management system has the slow-start increment value that current throughput will be increased over each slow-start interval, which are each defined by a slow-start interval period (i.e., the time period allotted for each slow-start interval).

Returning to FIG. 8, the bandwidth management system determines whether the Normal state timer is greater than the slow start interval period in step S410. If so, the operation passes to step S412. This illustrates how the system determines when to attempt to increase the throughput back to pre-throttling levels. If not, the operation passes to step S420. In step S412, the bandwidth management system resets the Normal state timer. The bandwidth management system increments the clock window size by the slow-start increment value in step S414. The operation then passes to step S420.

The bandwidth management system clocks the window in step S420. Using the slow-start increment, the system recovers from the throttling. Once the window has been clocked, in step S430, the current throughput is again compared to the bandwidth control parameters. More specifically, the current throughput is compared to the throttle down threshold. Then, in step S432, a new throttle down threshold value is computed. After which, the bandwidth management system determines if current throughput is greater than or equal to the throttle down threshold. If not, the operation returns to step S402. If so, the operation moves to step S436, wherein the bandwidth management system transitions to Pending state.

Figure 9:
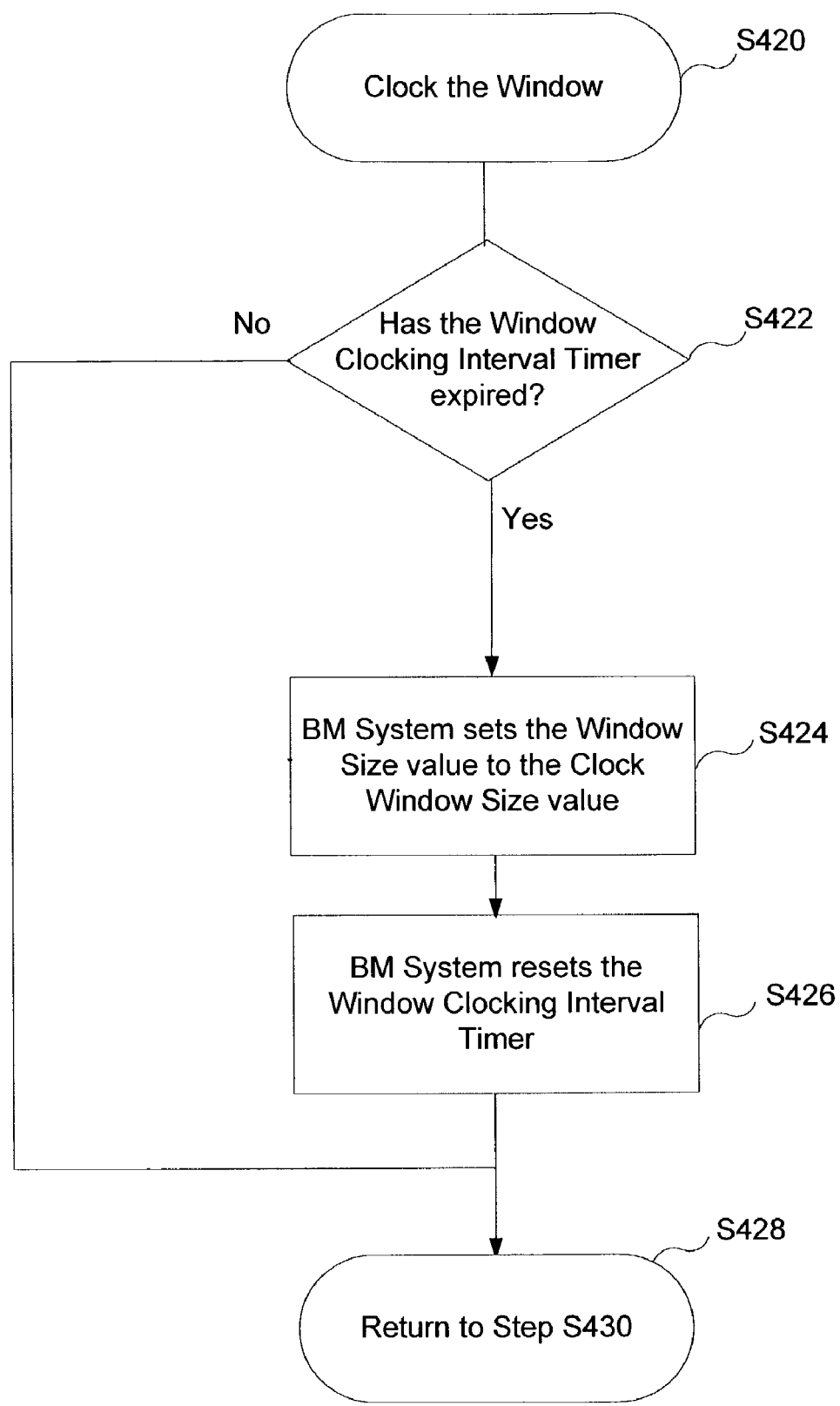
FIG. 9 is a flowchart showing the "Clock the Window" step of FIG. 8b in further detail in accordance with one embodiment of the system and method of the invention.

FIG. 9 is a flowchart showing the "Clock the Window" step of FIG. 8b in further detail in accordance with one embodiment of the system and method of the invention. The process begins in step S420, and then passes to step S422. Then, in step S422, the bandwidth management determines whether the window clocking interval has expired. If so, the process passes to step S424, wherein the window size is set to clock window size. Then, the window clocking interval is reset, in step S426, and then the process passes to step S428. However, if, in step S422, the window clocking interval has not expired, the process skips to step S428 and returns to step S430.

Figure 10:
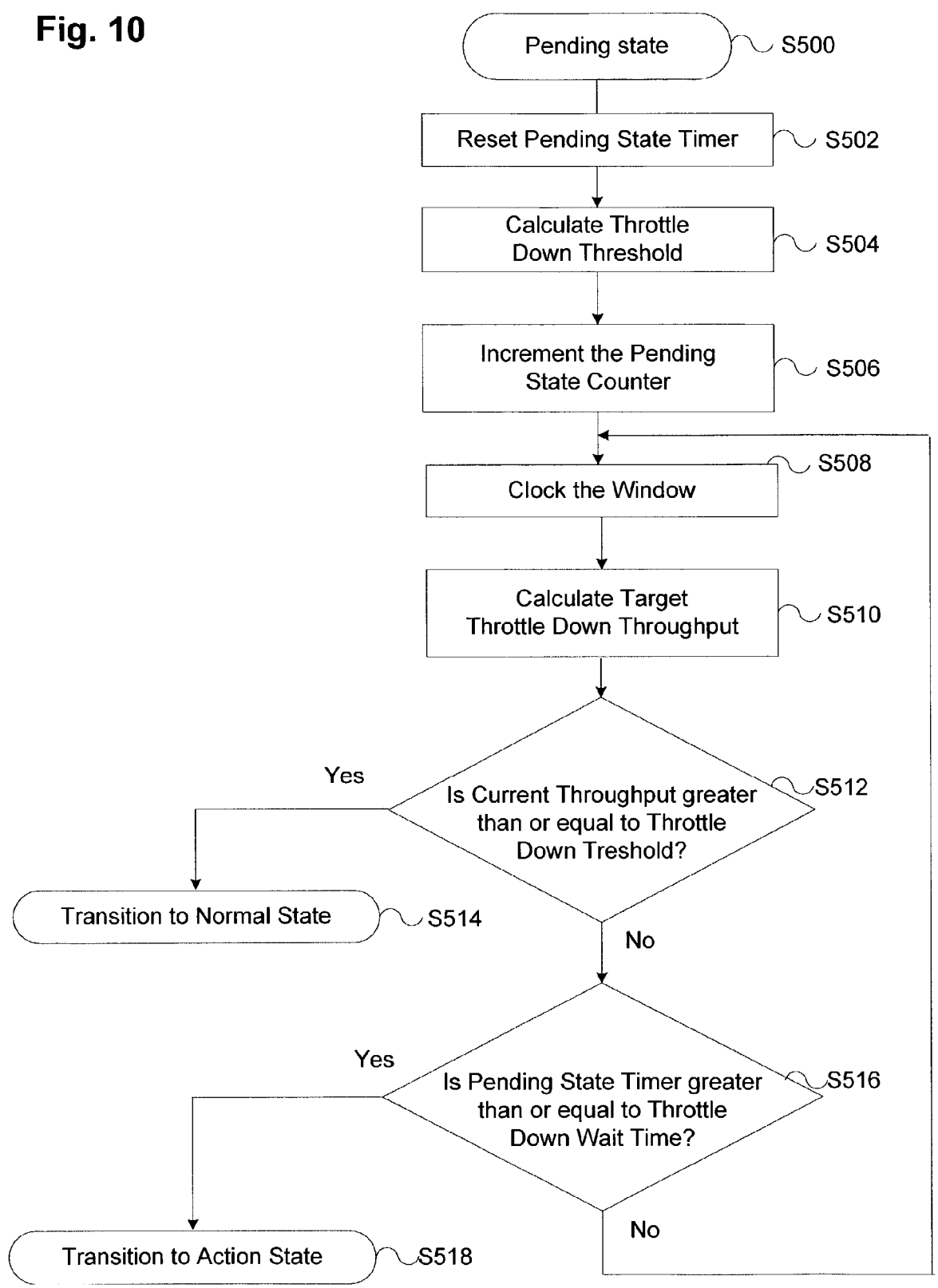
FIG. 10 is a flowchart showing the operation of an illustrative bandwidth management system in a pending state in accordance with one embodiment of the system and method of the invention.

FIG. 10 is a flowchart showing the operation of an illustrative bandwidth management system in a Pending state in accordance with one embodiment of the system and method of the invention. Pending state begins in step S500, and passes to step S502, wherein the bandwidth management system resets the Pending state timer. This timer represents the amount of time the bandwidth management system has been in the Pending state. Then, in step S504, the bandwidth management system calculates the throttle down threshold. The Pending state counter, which tracks the number of times the system enters this state during the session, is incremented, in step S506. The process then passes to step S508, wherein the window is clocked. Following the clocking of the window, the bandwidth management system calculates the target throttle down throughput, in step S510. The bandwidth management system then determines if current throughput is greater than or equal to throttle down threshold, in step S512. If so, the process passes to step S514, wherein the bandwidth management system transitions to Normal state. However, if the current throughput is less than the throttle down threshold, the process passes to step S516, wherein the bandwidth management system determines if the Pending state timer is greater than or equal to throttle down wait time. When the Pending state timer is greater than or equal to throttle down wait time, the process passes to step S518, wherein the bandwidth management system transitions to Action state. Alternatively, the process returns to step S508.

Figure 11A:
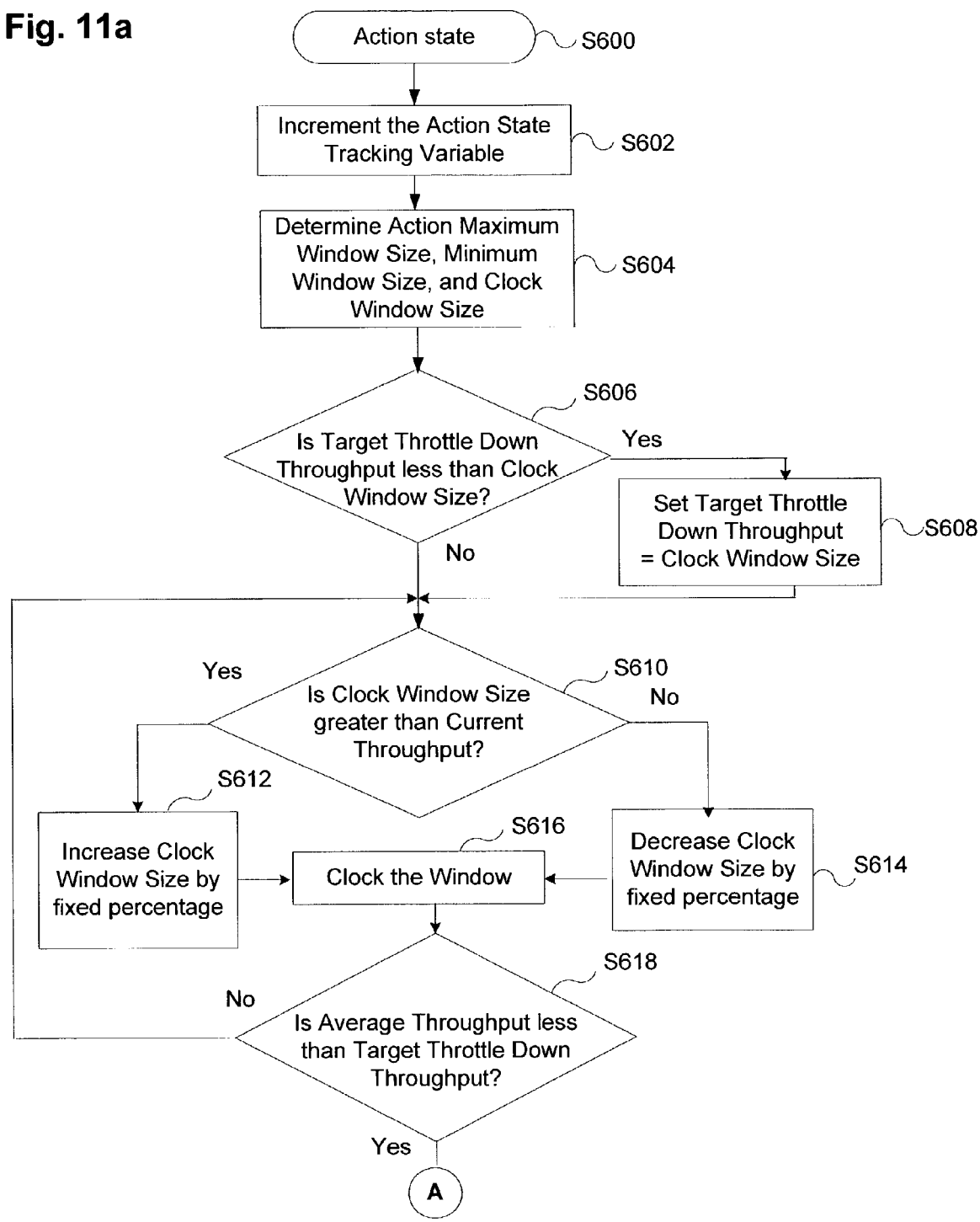
FIGS. 11a and 11b are flowcharts showing the operation of an illustrative bandwidth management system in an action state in accordance with one embodiment of the system and method of the invention.
Figure 11B:
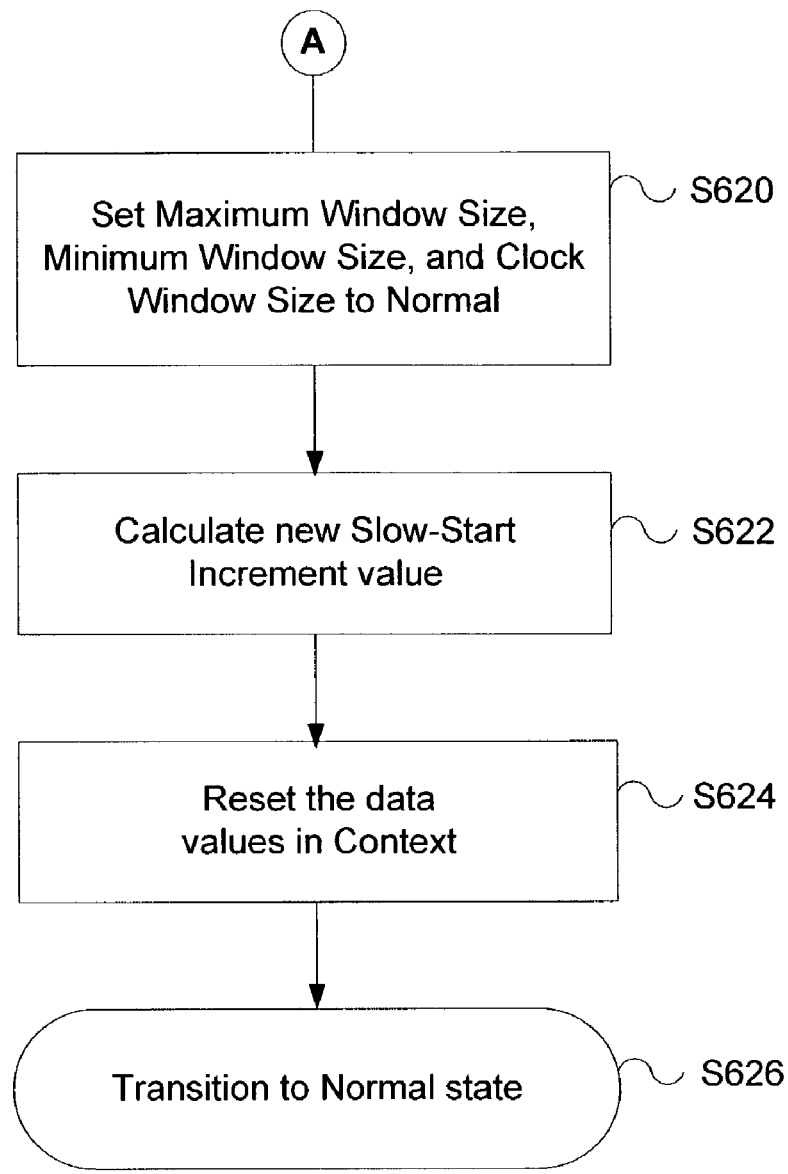

FIGS. 11a and 11b are flowcharts showing the operation of an illustrative bandwidth management system in the Action state in accordance with an embodiment of the system and method of the invention. Action state begins in step S600, and passes to step S602, wherein the Action state counter is incremented. This counter represents the number of times the bandwidth management system has entered the Action state. Then, in step S604, the bandwidth management system determines the maximum window size, minimum window size and clock window size. The bandwidth management system then determines if the target throttle down throughput is less than clock window size, in step S606. If so, the process passes to step S608, wherein the bandwidth management system sets the clock window size equal to target throttle down throughput. Then, the process passes to step S610.

When the target throttle down throughput is not less than clock window size, the process skips to step S610. The bandwidth management system then determines if the clock window size is greater than current throughput, in step S610. If the clock window size is greater than current throughput, the process passes to step S612, wherein the clock window size is increased by a fixed percentage. On the other hand, when the clock window size is not greater than current throughput, the process passes to step S614. Then, in step S614, the bandwidth management system decreases the clock window size by a second fixed percentage. Once the clock window size is changed in steps S612 and S614, the process passes to step S616, wherein the window is clocked. After the window is clocked, the bandwidth management system determines whether average throughput is less than target throttle down throughput, in step S618. If not, the process returns to step S610. If so, the bandwidth management system sets the maximum window size, minimum window size and clock window size to Normal, in step S620. Then, the bandwidth management system calculates a new slow-start increment value in step S622, and resets the data values in the context in step S624. The process then passes to step S626, wherein it transitions to Normal state.

Bandwidth Management System

Figure 12:
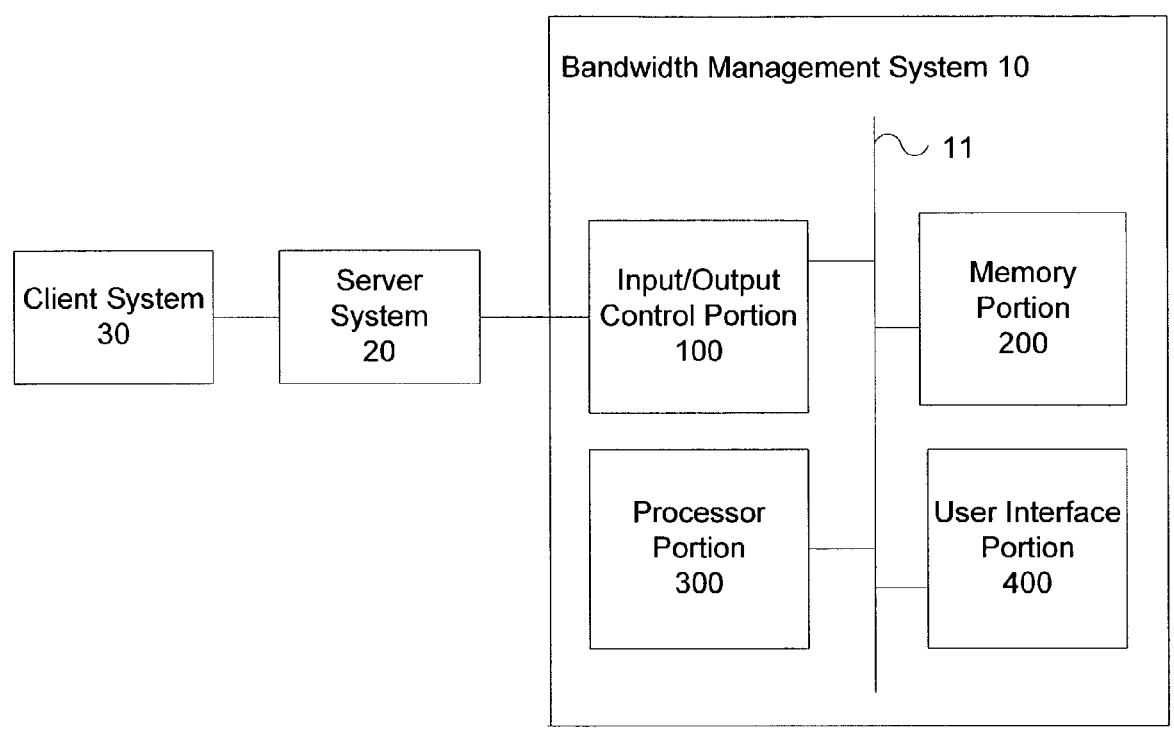
FIG. 12 shows an illustrative bandwidth management system, server system and client system in accordance with one embodiment of the system and method of the invention.

FIG. 12 shows an illustrative bandwidth management system, server system and client system in accordance with one embodiment of the system and method of the invention. As shown in FIG. 12, the bandwidth management system 10, the server system 20, and the client system 30 are connected over a suitable communications network, such as a LAN or WAN. An administrator utilizes the bandwidth management system 10 to control, configure and monitor the exchange of data between the server system 20 and client system 30. In further embodiments, the bandwidth management system 10 may perform the same function for other systems in the network, including additional servers and client systems.

Bandwidth management system 10 includes an input/output portion 100, memory portion 200, processor portion 300 and user interface portion 400. These components are in communication with each other through interface 11, which may be a data bus. The input/output portion 100 monitors the exchange of data between the server system 20 and client system 30 through the receipt of input from the server system 20. The input/output portion 100 also transmits instructions to the server system 20, which provide the amount of data that can be transferred from the server system 20 to the client system 30. The processor portion 300 retrieves the data stored in the memory portion 200 to determine the state of the bandwidth management system 10. Once the processor portion 300 determines the session values from those stored in the memory portion 200 by the input/output portion 100, the processor portion 300 stores those values for retrieval by the input/output portion 100 for delivery to the server system 20.

Figure 13:
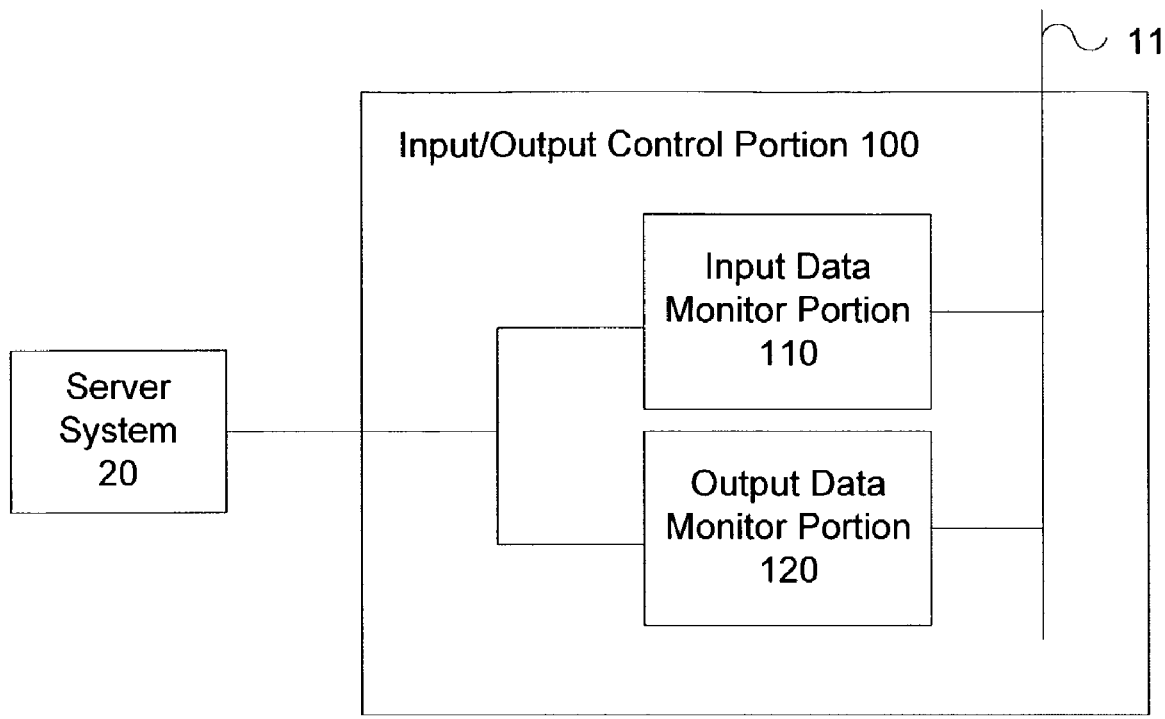
FIG. 13 shows the input/output control portion of FIG. 12 in further detail in accordance with one embodiment of the system and method of the invention.

FIG. 13 shows the input/output control portion of FIG. 12 in further detail in accordance with one embodiment of the system and method of the invention. As stated above, the input/output control portion 100 receives input from the server system 20 detailing the results of data exchanges between it and the client system 30. This input is received by the input data monitor portion 110, which stores values representing the units of data transferred over fixed intervals in the memory portion 200. The output data monitor portion 120 is responsible for communicating instructions to the server system 20 detailing the number of data units that can be transferred to the client system 30 over a fixed interval. The output data monitor portion 120 retrieves this information from the memory portion 200 after it has been calculated and stored there by the processor portion 300.

Figure 14:
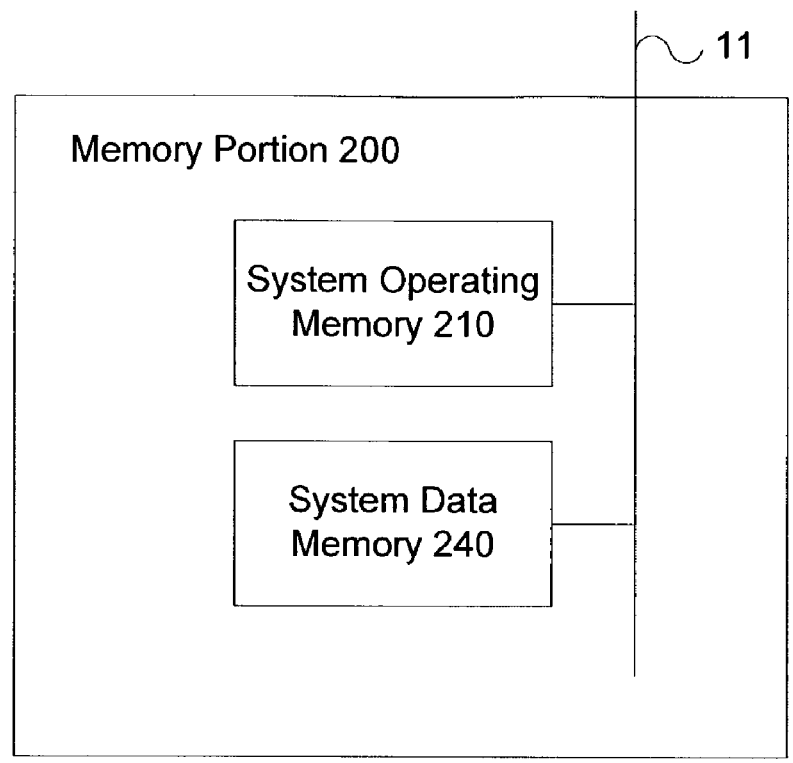
FIG. 14 shows the memory portion of FIG. 12 in further detail in accordance with one embodiment of the system and method of the invention.

FIG. 14 shows the memory portion of FIG. 12 in further detail in accordance with one embodiment of the system and method of the invention. Memory portion 200 further includes system operating memory 210 and system data memory 240. The system operating memory 210 contains the information and data for controlling the bandwidth management system 10. The system data memory 240 contains information reported to the input data monitor portion 110 detailing the exchange of data between the server system 20 and client system 30. The system data memory 240 also contains data prepared by the processor portion 300 detailing the actual session values.

Figure 15:
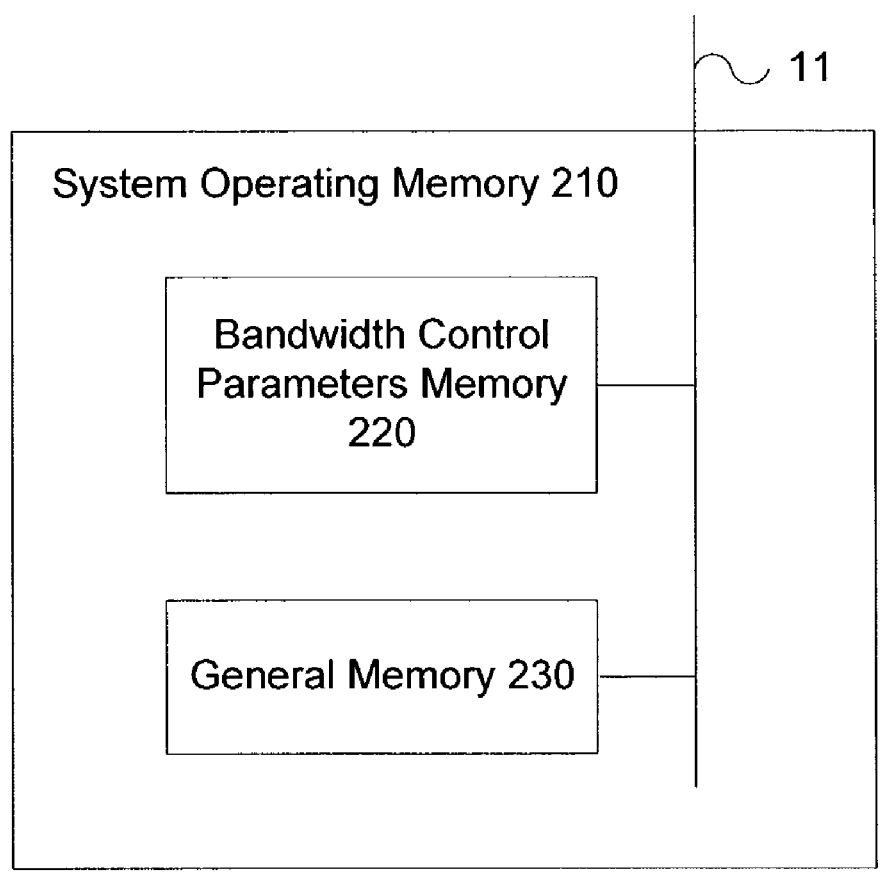
FIG. 15 shows the system operating memory of FIG. 14 in further detail in accordance with one embodiment of the system and method of the invention.

FIG. 15 shows the system operating memory of FIG. 14 in further detail in accordance with one embodiment of the system and method of the invention. The system operating memory 210 further includes bandwidth control parameters memory 220 and general memory 230.

Figure 16:
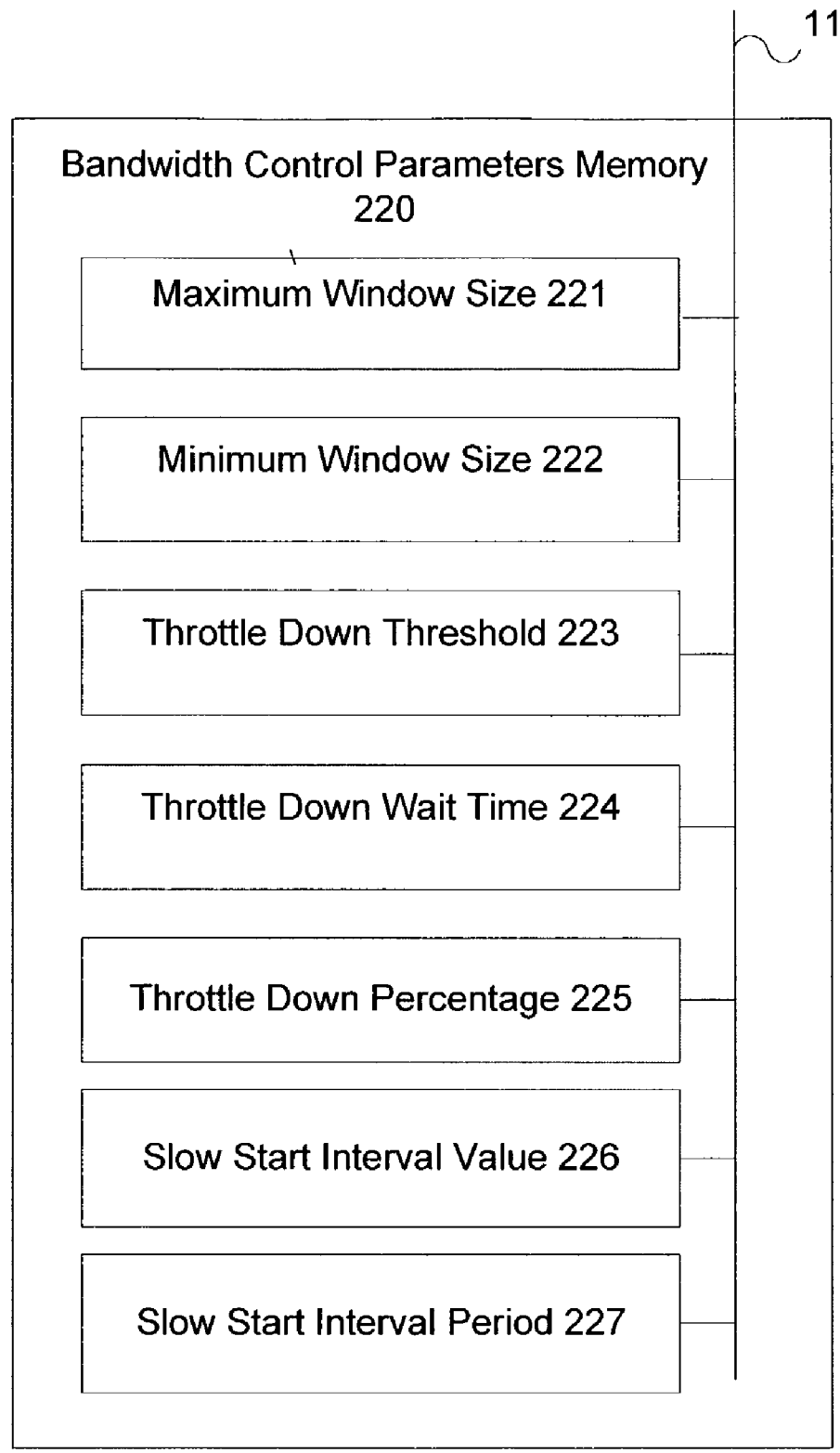
FIG. 16 shows the bandwidth control parameters memory of FIG. 15 in further detail in accordance with one embodiment of the system and method of the invention.

FIG. 16 shows the bandwidth control parameters memory of FIG. 15 in further detail in accordance with one embodiment of the system and method of the invention. The bandwidth control parameters memory 220 stores the user-defined parameters utilized in determining the various states of the bandwidth management system 10. These values include the maximum window size 221, minimum window size 222, throttle down threshold 223, throttle down wait time 224 and throttle down percentage 225. The maximum window size 221 is a set value representing the maximum allowable throughput rate for communication between the server system 20 and client system 30. The minimum window size 221 is a set value representing the minimum throughput rate that the bandwidth management system 10 will maintain for communication between the server system 20 and client system 30. The throttle down threshold 223 represents a fixed percentage of average throughput below which current throughput must fall to send the bandwidth management system to Pending state. The throttle down wait time 224 is the amount of time the current throughput must remain below the throttle down threshold to trigger a transition from Pending to Action state. The throttle down percentage 225 represents the amount current throughput is reduced in the Action state.

Additionally, the bandwidth control parameters memory 220 further stores values used in the recovery of the bandwidth utilization following the alleviation of client-side contention. For example, the slow-start interval value 226 represents the number of intervals over which the bandwidth management system 10 attempts to increase current throughput back to the maximum window size when transitioning from an Action state to Normal state. The slow-start interval period 227 sets the amount of time separating each slow-start increment interval. Using these values, the bandwidth management system 10 attempts to increase throughput by an amount equal to maximum client throughput less current throughput divided by the number of slow-start intervals. While attempting to increase the throughput back to the maximum window size, if the bandwidth management system 10 detects that current throughput is less than the throttle down threshold, it returns to the Pending state. Other data and information necessary for the operation of the bandwidth management system 10 is stored in general memory 230.

Figure 17:
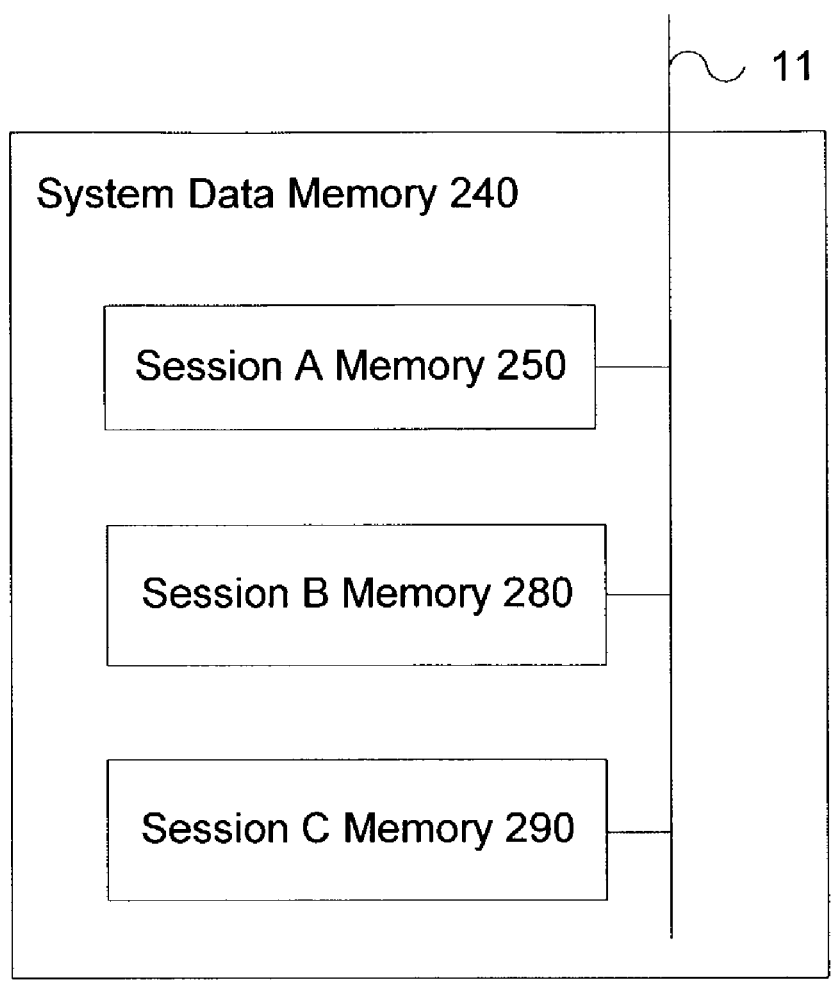
FIG. 17 shows the system data memory of FIG. 14 in further detail in accordance with one embodiment of the system and method of the invention.

FIG. 17 shows the system data memory of FIG. 14 in further detail in accordance with one embodiment of the system and method of the invention. The system data memory 240 includes the memory stores, or contexts, used to hold the data used in the management of the various client-communication sessions. In this embodiment, Session A memory 250, Session B memory 280 and Session C memory 290 are shown. However, given that each client-communication session has its own instance of a session memory, it should be appreciated that the system data memory 240 may hold several additional session memories.

Figure 18:
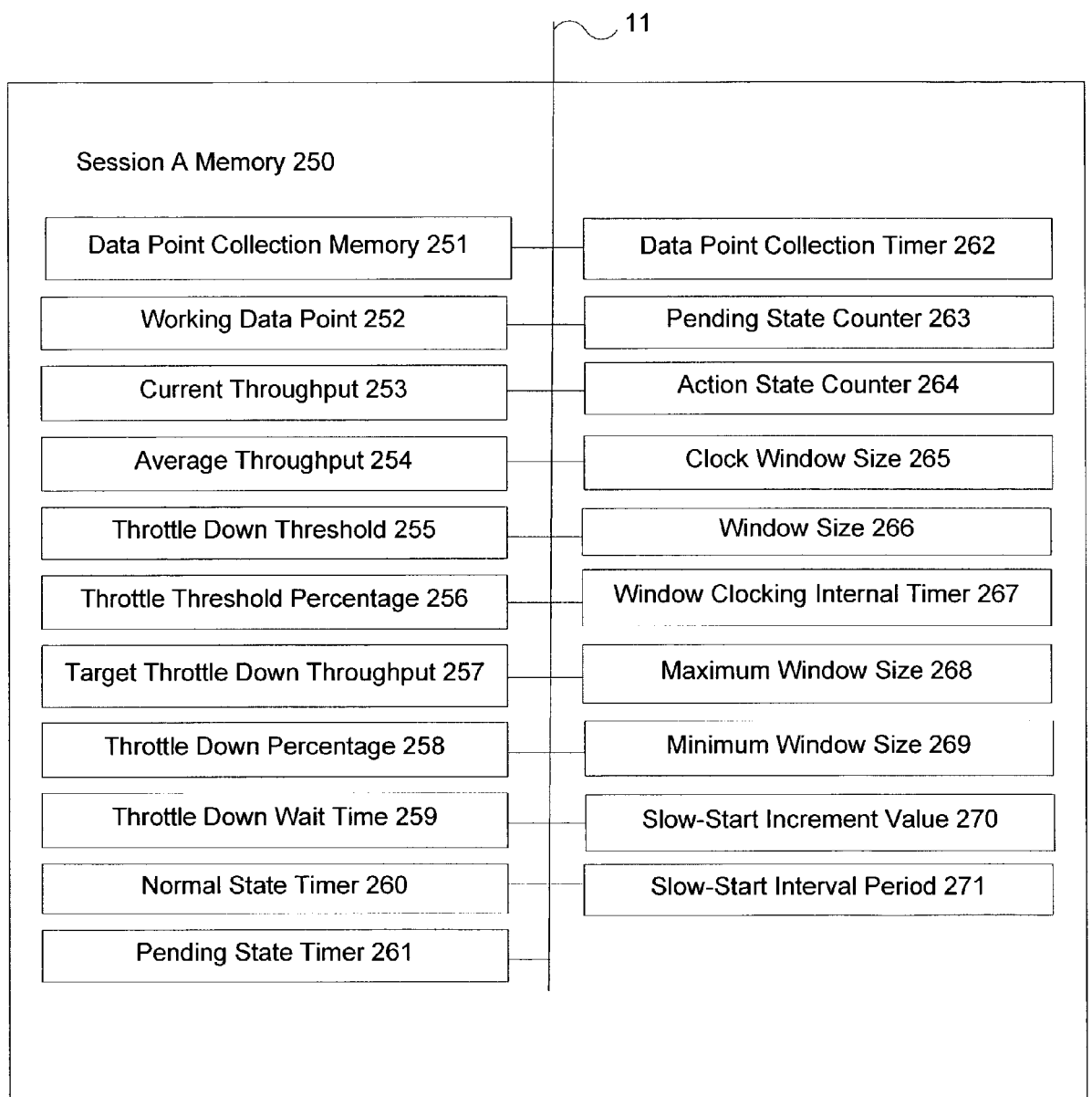
FIG. 18 show the session A memory of FIG. 17 in further detail in accordance with one embodiment of the system and method of the invention.

FIG. 18 shows the session A memory of FIG. 17 in further detail in accordance with one embodiment of the system and method of the invention. The Session A memory 250 includes data point collection memory 251, and other values, such as working data point 252, current throughput 253, average throughput 254, current throttle down threshold 255, throttle threshold percentage 256, target throttle down throughput 257, throttle down percentage 258, throttle down wait time 259, normal state timer 260, pending state timer 261, data point collection timer 262, pending state counter 263, action state counter 264, clock window size 265, window size 266 window clocking interval timer 267, maximum window size 268, minimum window size 269, slow-start increment value 270, and slow-start interval period 271.

The data point collection memory 251 contains the data points collected during the operation of the bandwidth management system. These data points indicate the total number of data units transferred, and the elapsed time over which the data was transferred. The processor portion 300 uses these values to determine the current throughput and average throughput.

The working data point 252 is a value that represents the total number of data units transferred in an interval. This value may be "working" because it may increase by a number of data units even before the interval ends, i.e. upon the expiration of the data point collection timer 262. However, once the interval ends and the data is stored as a data point in the data point collection 251, the data point collection timer 262 and the working data point 252 are both reset. The values contained in session A memory 250 are determined by the processor portion 300, following the updating of the working data point 252 by the input data monitor portion 110.

Figure 19:
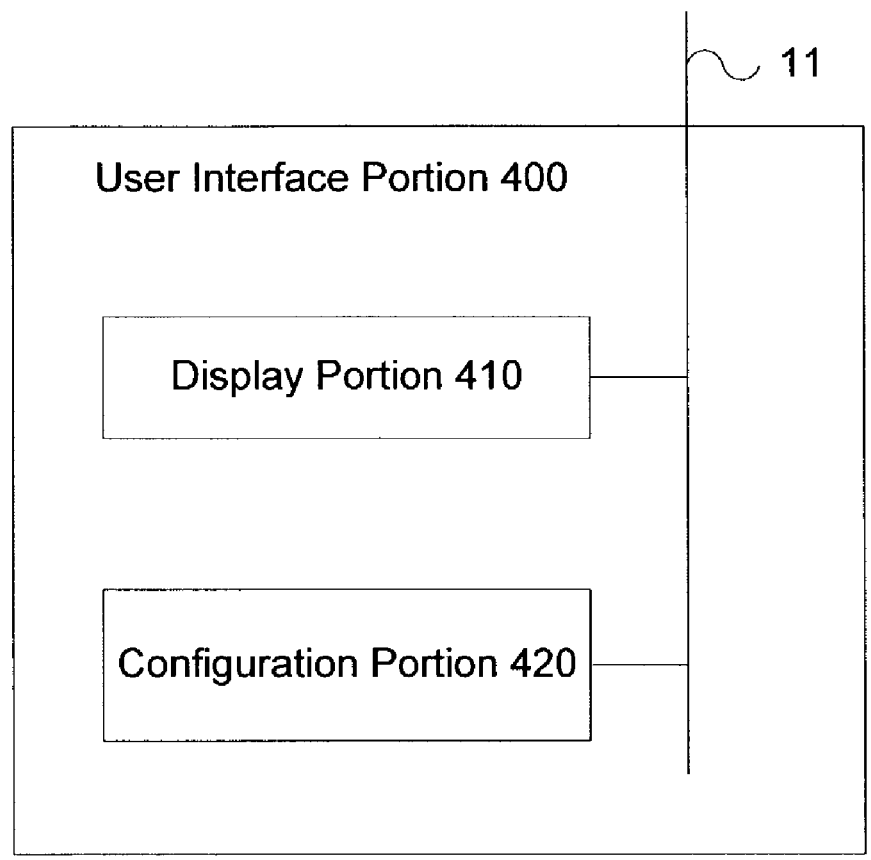
FIG. 19 shows the user interface portion of FIG. 12 in further detail in accordance with one embodiment of the system and method of the invention.

FIG. 19 shows the user interface portion of FIG. 12 in further detail in accordance with one embodiment of the system and method of the invention. The user interface portion 400 further includes display portion 410 and configuration portion 420. The display portion 410 presents the administrator with the interface used to monitor the operation of the bandwidth management system. In one aspect, the administrator can view real-time values for current throughput and average throughput. The display portion 410 may also display an event log describing the number of times the system has transitioned from the various states, or the throughput has hit the maximum or minimum allowed throughput. The configuration portion 420 provides the interfaces through which the administrator inputs the various bandwidth control parameters. The configuration portion 420 also displays a list of configuration files containing customized, and/or predefined, bandwidth control parameters, as described above. Using the list of configuration files, the administrator can select a given configuration file for controlling bandwidth utilization.

The configuration portion 420 further allows the administrator to configure the bandwidth control parameters while a communication session is on-going. Accordingly, the administrator can either customize the parameters or select a new configuration file for controlling the session, and then choose to set a network configuration event that will change the session parameters. In another embodiment, the administrator may establish a scheme such that the connection speed measured in the server/client session determines the particular configuration file that will apply for the session.

The bandwidth management system 10, as shown in FIGS. 12–19, has been described in the form of a computer system. The term "computer system" or "operating system" is to be understood to include at least one processor utilizing a memory or memories. The memory stores at least portions of an executable program code at one time or another during operation of the processor. Additionally, the processor executes various instructions included in that executable program code. An executable program code means a program in machine language or other language that is able to run in a particular computer system environment to perform a particular task. The executable program code process data in response to commands by a user. As used herein, it will be appreciated that the term "executable program code" and term "software" mean substantially the same thing for the purposes of the description as used herein.

It should also be appreciated that to practice the system and method of the invention, it is not necessary that the processor, or subportions of the processor, and/or the memory, or subportions of the memory be physically located in the same place or disposed in the same physical portion of the bandwidth management system 10. Each of the processor and the memory may be located in geographically distinct locations and connected so as to communicate in any suitable manner, such as over a wireless communication path, for example. Each of the processor and/or the memory may also be composed of different physical pieces of equipment. It is not necessary that the processor be one single piece of equipment in one location and that the memory be another single piece of equipment in another location. The processor may be two pieces of equipment in two different physical locations connected in any suitable manner. Additionally, each respective portion of the memory described above may include two or more portions of memory in two or more physical locations, including or utilizing memory stores from the Internet, an Intranet, an Extranet, a LAN, a WAN or some other source or over some other network, as may be necessary or desired.

Furthermore, software enables the computer operating system to perform the operations described above and may be supplied on any of a wide variety of data holding media. The implementation and operation of the invention may be in the form of computer code written in any suitable programming language, which provide instructions to the computer. It should further be appreciated that the software code or programming language that is utilized in a computer system to perform the various operations of the above described invention may be provided in any of a wide variety of forms. Illustratively, the software may be provided in the form of machine language, assembly code, object code, source language, or other program. The software may be in the form of compressed or encrypted data utilizing a known compression format or encryption algorithm.

Additionally, it should be appreciated that the particular software medium utilized may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention, which is utilized in operation of the bandwidth management system 10, may be provided in the form of a hard disk or be transmitted in some form using a direct wireless telephone connection, the Internet, an Intranet, or a satellite transmission, for example. Further, the programming language enabling the system and method of the invention as described above may be utilized on all of the foregoing and any other medium by which software or executable program code, such as a flash application, may be communicated to and utilized by a computer or other operating system.

As described herein, the system and method of the invention may utilize an application program, a collection of separate application programs, a module of a program that is designed to handle, or a portion of a module of a program, for example. As noted above, it should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, in the system and method of the invention, a variety of user interfaces may be utilized. A user interface may be in the form of an interactive application presented on an administrator system, for example. The application could include fields for accepting data and the user-defined bandwidth control parameters, as well as displays for monitoring bandwidth utilization. As used herein, a user interface includes any software, hardware or combination of hardware and software used in an operating system that allows a user to interact with the operating system. A user interface may include any of a touch screen, keyboard, mouse, or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

A user interface is utilized by an operating system running an application program to process data for a user. As should be appreciated, a user interface is typically used by a computer for interacting with a user either to convey information or receive information. However, it should be appreciated that in accordance with the system and method of the invention, it is not necessary that a human user actually interact with a user interface generated by the operating system of the invention. Rather, it is contemplated that the user interface of the invention interact, i.e., convey and receive information, in communication with another operating system or computer, rather than a human user. Further, it is contemplated that the user interfaces utilized in the system and method of the invention may interact partially with another operating system while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It is understood that the present invention may be practiced by adding additional steps to the method, omitting steps within the process, and/or altering the order in which the steps are performed in the process.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

We claim:

1. A method of managing bandwidth utilization during a communication session between a client system and a server system comprising:

monitoring data exchanged between the client system and server system, the client system operating a first application and a second application;

detecting client-side contention for available bandwidth between the first application and the second application; and reducing accessible bandwidth for the first application based on the client-side contention;

wherein the client system and server system are in communication with each other over a communications network, wherein at least one of the actions of monitoring, detecting, and reducing are performed external to the client system, wherein the step of monitoring data exchanged between the client system and server system includes:

accepting input from the server system, the input including a data value indicating a total amount of data exchanged between the server system and the client system during the communication session and further including a time value representing an amount of time that has elapsed since said monitoring began; and storing the input for processing;

wherein the step of storing input from the server system repeatedly occurs at a user-defined interval, wherein the step of storing the input for processing further includes maintaining a set of inputs received from the server system, wherein the set of inputs have a maximum capacity of stored inputs, the stored inputs determined on a FIFO basis, and wherein the maximum capacity is 120 stored inputs.

2. The method of claim 1, wherein the user-defined interval is a one second period.

3. The method of claim 1, wherein the step of detecting client-side contention for available bandwidth includes:

comparing a current throughput value for the first application at current time to a current throttle down threshold value, the current throughput value representing a first average of data units transferred per unit time between first time and current time, the current throttle down threshold value representing a user-defined percentage of an average throughput value, the average throughput value representing a second average of data units transferred per unit time between second time and current time; and inferring client-side contention when the current throughput value for the first application is less than or equal to the current throttle down threshold value.

4. The method of claim 3, wherein the step of inferring client-side contention further includes determining that the current throughput value is less than or equal to the current throttle down threshold value for at least a predetermined number of user-defined intervals.

5. The method of claim 1, wherein the step of reducing accessible bandwidth for the first application based on the client-side contention includes:

determining a target throughput value; and limiting exchange of data between server system and client system over a user-defined interval to the target throughput value.

6. The method of claim 5, wherein the target throughput value is a user-defined percentage of current throughput.

7. The method of claim 5, wherein the step of limiting exchange of data between server system and client system to target throughput value includes providing the server system with a window size value representing a maximum number of data units that are transferable over the user-defined interval.

8. The method of claim 7, further including:

receiving from the server system an actual number of data units transferred prior to expiration of the user-defined interval;

decreasing the window size value by the actual number of data units transferred to produce an updated window size value representing a remaining number of data units that are transferable before the user-defined interval expires; and providing the server system with the updated window size value.

9. The method of claim 8 wherein the updated window size value is reset to window size value upon expiration of the user-defined interval.

10. The method of claim 7 further comprising increasing accessible bandwidth for the first application.

11. The method of claim 10 wherein increasing accessible bandwidth for the first application includes:
increasing the target throughput value by a slow-start increment value to produce an updated target throughput value; and
limiting exchange of data between server system and client system for a user-defined slow-start interval to the updated target throughput value.

12. The method of claim 11, wherein the slow-start increment value is a user-defined maximum throughput less current throughput, divided by a predetermined number of slow-start intervals.

13. The method of claim 11, wherein the predetermined number of slow-start intervals is three.

14. A method of managing bandwidth utilization during a communication session between a client system and a server system comprising:
monitoring data exchanged between the client system and server system, the client system operating a first application and a second application;
detecting client-side contention for available bandwidth between the first application and the second application; and
reducing accessible bandwidth for the first application based on the client-side contention;
wherein the client system and server system are in communication with each other over a communications network,
wherein at least one of the actions of monitoring, detecting, and reducing are performed external to the client system,
wherein the step of detecting client-side contention for available bandwidth includes:
comparing a current throughput value for the first application at current time to a current throttle down threshold value, the current throughput value representing a first average of data units transferred per unit time between first time and current time, the current throttle down threshold value representing a user-defined percentage of an average throughput value, the average throughput value representing a second average of data units transferred per unit time between second time and current time; and
inferring client-side contention when the current throughput value for the first application is less than or equal to the current throttle down threshold value; and
wherein the first time occurs 10 seconds before the current time.

15. A method of managing bandwidth utilization during a communication session between a client system and a server system comprising:
monitoring data exchanged between the client system and server system, the client system operating a first application and a second application;
detecting client-side contention for available bandwidth between the first application and the second application; and
reducing accessible bandwidth for the first application based on the client-side contention;
wherein the client system and server system are in communication with each other over a communications network,
wherein at least one of the actions of monitoring, detecting, and reducing are performed external to the client system,
wherein the step of detecting client-side contention for available bandwidth includes:
comparing a current throughput value for the first application at current time to a current throttle down threshold value, the current throughput value representing a first average of data units transferred per unit time between first time and current time, the current throttle down threshold value representing a user-defined percentage of an average throughput value, the average throughput value representing a second average of data units transferred per unit time between second time and current time; and inferring client-side contention when the current throughput value for the first application is less than or equal to the current throttle down threshold value; and
wherein the second time occurs 120 seconds before the current time.

16. A method of managing bandwidth utilization during a communication session between a client system and a server system comprising:
monitoring data exchanged between the client system and server system, the client system operating a first application and a second application;
detecting client-side contention for available bandwidth between the first application and the second application;
reducing accessible bandwidth for the first application based on the client-side contention; and
increasing accessible bandwidth for the first application;
wherein the client system and server system are in communication with each other over a communications network, and
wherein at least one of the actions of monitoring, detecting, and reducing are performed external to the client system,
wherein the step of reducing accessible bandwidth for the first application based on the client-side contention includes:
determining a target throughput value; and
limiting exchange of data between server system and client system over a user-defined interval to the target throughput value;
wherein the step of limiting exchange of data between server system and client system to target throughput value includes providing the server system with a window size value representing a maximum number of data units that are transferable over the user-defined interval,
wherein increasing accessible bandwidth for the first application includes:
increasing the target throughput value by a slow-start increment value to produce an updated target throughput value, and
limiting exchange of data between server system and client system for a user-defined slow-start interval to the updated target throughput value, and
wherein the user-defined slow-start interval is ten seconds.

* * * * *